(12) United States Patent
Levergood et al.

(10) Patent No.: US 8,606,900 B1
(45) Date of Patent: Dec. 10, 2013

(54) METHOD AND SYSTEM FOR COUNTING WEB ACCESS REQUESTS

(75) Inventors: Thomas Mark Levergood, Hopkinton, MA (US); Lawrence C. Stewart, Burlington, MA (US); Stephen Jeffrey Morris, Westford, MA (US); Andrew C. Payne, Lincoln, MA (US); George Winfield Treese, Newton, MA (US)

(73) Assignee: Soverain Software LLC, Chicago, IL (US)

( * ) Notice: Subject to any disclaimer, the term of this patent is extended or adjusted under 35 U.S.C. 154(b) by 1645 days.

(21) Appl. No.: 09/548,237

(22) Filed: Apr. 12, 2000

Related U.S. Application Data

(60) Division of application No. 09/005,479, filed on Jan. 12, 1998, now Pat. No. 7,272,639, which is a continuation of application No. 08/474,096, filed on Jun. 7, 1995, now Pat. No. 5,708,780.

(51) Int. Cl.
*G06F 15/173* (2006.01)
(52) U.S. Cl.
USPC .......................... 709/224; 709/226; 709/228
(58) Field of Classification Search
USPC .................... 709/203, 217–219, 224, 226
See application file for complete search history.

(56) References Cited

U.S. PATENT DOCUMENTS

| 2,196,914 | A | 4/1940 | Goldman |
|---|---|---|---|
| 4,073,368 | A | 2/1978 | Mustapick |
| 4,264,808 | A | 4/1981 | Owens et al. |
| 4,305,059 | A | 12/1981 | Benton |
| 4,317,957 | A | 3/1982 | Sendrow |
| 4,449,186 | A | 5/1984 | Kelly et al. |
| 4,484,304 | A | 11/1984 | Anderson et al. |
| 4,528,643 | A | 7/1985 | Freeny, Jr. |
| 4,529,870 | A | 7/1985 | Chaum |
| 4,547,851 | A | 10/1985 | Kurland |
| 4,566,078 | A | 1/1986 | Crabtree |
| 4,567,359 | A | 1/1986 | Lockwood |
| 4,578,530 | A | 3/1986 | Zeidler |
| 4,654,482 | A | 3/1987 | DeAngelis |
| 4,685,055 | A | 8/1987 | Thomas |
| 4,734,858 | A | 3/1988 | Schlafly |
| 4,755,940 | A | 7/1988 | Brachtl et al. |

(Continued)

FOREIGN PATENT DOCUMENTS

| EP | 0172670 | 2/1986 |
|---|---|---|
| EP | 0 456 920 | 11/1991 |

(Continued)

OTHER PUBLICATIONS

James E. Pitkow, WebViz: A Tool for World-Wide Web Access Log Analysis, First International World Wide Web Conf, May 1994, 7 pages.*

(Continued)

*Primary Examiner* — Patrice Winder
(74) *Attorney, Agent, or Firm* — Sterne Kessler Goldstein & Fox PLLC

(57) ABSTRACT

Service requests from a client to a server system through a network are processed. A session identifier is appended to requests for information. The server responds to the requests from the client by returning the requested information to the client. Requests to particular information are counted, exclusive of repeated requests from a common client.

22 Claims, 7 Drawing Sheets

(56) References Cited

U.S. PATENT DOCUMENTS

| | | |
|---|---|---|
| 4,759,063 A | 7/1988 | Chaum |
| 4,759,064 A | 7/1988 | Chaum |
| 4,775,935 A | 10/1988 | Yourick |
| 4,791,566 A | 12/1988 | Sudama et al. |
| 4,795,890 A | 1/1989 | Goldman |
| 4,799,156 A | 1/1989 | Shavit et al. |
| 4,805,134 A | 2/1989 | Calo et al. |
| 4,812,628 A | 3/1989 | Boston et al. |
| 4,827,508 A | 5/1989 | Shear |
| 4,887,208 A | 12/1989 | Schneider et al. |
| 4,891,503 A | 1/1990 | Jewell |
| 4,922,521 A | 5/1990 | Krikke et al. |
| 4,926,480 A | 5/1990 | Chaum |
| 4,931,932 A | 6/1990 | Dalnekoff et al. |
| 4,935,870 A | 6/1990 | Burk, Jr. et al. |
| 4,941,089 A | 7/1990 | Fischer |
| 4,947,028 A | 8/1990 | Gorog |
| 4,947,430 A | 8/1990 | Chaum |
| 4,949,380 A | 8/1990 | Chaum |
| 4,959,686 A | 9/1990 | Spallone et al. |
| 4,972,318 A | 11/1990 | Brown et al. |
| 4,977,595 A | 12/1990 | Ohta et al. |
| 4,982,346 A | 1/1991 | Girouard et al. |
| 4,984,155 A | 1/1991 | Geier et al. |
| 4,987,593 A | 1/1991 | Chaum |
| 4,991,210 A | 2/1991 | Chaum |
| 4,992,940 A | 2/1991 | Dworkin |
| 4,996,711 A | 2/1991 | Chaum |
| 5,025,373 A | 6/1991 | Keyser, Jr. et al. |
| 5,035,515 A | 7/1991 | Crossman et al. |
| 5,047,614 A | 9/1991 | Bianco |
| 5,060,153 A | 10/1991 | Nakagawa |
| 5,077,607 A | 12/1991 | Johnson et al. |
| 5,105,184 A | 4/1992 | Pirani et al. |
| 5,113,496 A | 5/1992 | McCalley et al. |
| 5,157,783 A | 10/1992 | Anderson et al. |
| 5,165,020 A | 11/1992 | Sudama et al. |
| 5,204,947 A | 4/1993 | Bernstein et al. |
| 5,220,501 A | 6/1993 | Lawlor et al. |
| 5,235,509 A | 8/1993 | Mueller et al. |
| 5,247,575 A | 9/1993 | Sprague et al. |
| 5,265,239 A | 11/1993 | Ardolino |
| 5,276,736 A | 1/1994 | Chaum |
| 5,285,383 A | 2/1994 | Lindsey et al. |
| 5,297,249 A | 3/1994 | Bernstein et al. |
| 5,305,195 A | 4/1994 | Murphy |
| 5,309,437 A | 5/1994 | Perlman et al. |
| 5,310,997 A | 5/1994 | Roach et al. |
| 5,311,594 A | 5/1994 | Penzias |
| 5,313,637 A | 5/1994 | Rose |
| 5,319,542 A | 6/1994 | King, Jr. et al. |
| 5,321,751 A | 6/1994 | Ray et al. |
| 5,325,362 A | 6/1994 | Aziz |
| 5,329,619 A | 7/1994 | Page et al. |
| 5,336,870 A | 8/1994 | Hughes et al. |
| 5,341,429 A | 8/1994 | Stringer et al. |
| 5,347,632 A | 9/1994 | Filepp et al. |
| 5,351,186 A | 9/1994 | Bullock et al. |
| 5,351,293 A | 9/1994 | Michener et al. |
| 5,353,283 A | 10/1994 | Tsuchiya |
| 5,383,113 A | 1/1995 | Kight et al. |
| 5,388,257 A | 2/1995 | Bauer |
| 5,414,833 A | 5/1995 | Hershey et al. |
| 5,414,841 A | 5/1995 | Bingham et al. |
| 5,428,606 A | 6/1995 | Moskowitz |
| 5,434,918 A | 7/1995 | Kung et al. |
| 5,440,479 A | 8/1995 | Hutton |
| 5,455,953 A | 10/1995 | Russell |
| 5,457,738 A | 10/1995 | Sylvan |
| 5,475,585 A | 12/1995 | Bush |
| 5,483,652 A | 1/1996 | Sudama et al. |
| 5,491,820 A | 2/1996 | Belove et al. |
| 5,506,961 A | 4/1996 | Carlson et al. |
| 5,521,631 A | 5/1996 | Budow et al. |
| 5,526,483 A | 6/1996 | French et al. |
| 5,530,852 A * | 6/1996 | Meske et al. ................... 709/206 |
| 5,535,229 A | 7/1996 | Hain, Jr. et al. |
| 5,539,735 A | 7/1996 | Moskowitz |
| 5,542,046 A | 7/1996 | Carlson et al. |
| 5,544,320 A | 8/1996 | Konrad |
| 5,544,322 A | 8/1996 | Cheng et al. |
| 5,550,984 A | 8/1996 | Gelb |
| 5,557,516 A | 9/1996 | Hogan |
| 5,557,518 A | 9/1996 | Rosen |
| 5,557,798 A | 9/1996 | Skeen et al. |
| 5,560,008 A | 9/1996 | Johnson et al. |
| 5,576,951 A | 11/1996 | Lockwood |
| 5,577,209 A | 11/1996 | Boyle et al. |
| 5,581,753 A | 12/1996 | Terry et al. |
| 5,583,996 A | 12/1996 | Tsuchiya |
| 5,590,197 A | 12/1996 | Chen et al. |
| 5,592,378 A | 1/1997 | Cameron et al. |
| 5,594,910 A | 1/1997 | Filepp et al. |
| 5,596,642 A | 1/1997 | Davis et al. |
| 5,596,643 A | 1/1997 | Davis et al. |
| 5,598,535 A | 1/1997 | Brech et al. |
| 5,598,536 A | 1/1997 | Slaughter, III et al. |
| 5,603,025 A | 2/1997 | Tabb et al. |
| 5,604,802 A | 2/1997 | Holloway |
| 5,619,648 A | 4/1997 | Canale et al. |
| 5,621,797 A | 4/1997 | Rosen |
| 5,623,547 A | 4/1997 | Jones et al. |
| 5,623,656 A | 4/1997 | Lyons |
| 5,638,519 A | 6/1997 | Haluska |
| 5,642,419 A | 6/1997 | Rosen |
| 5,642,515 A | 6/1997 | Jones et al. |
| 5,649,185 A | 7/1997 | Antognini et al. |
| 5,664,110 A | 9/1997 | Green et al. |
| 5,664,111 A | 9/1997 | Nahan et al. |
| 5,675,507 A | 10/1997 | Bobo, II |
| 5,684,965 A | 11/1997 | Pickering |
| 5,687,367 A | 11/1997 | Dockter et al. |
| 5,689,638 A | 11/1997 | Sadovsky |
| 5,694,546 A | 12/1997 | Reisman |
| 5,694,549 A | 12/1997 | Carlin et al. |
| 5,694,551 A | 12/1997 | Doyle et al. |
| 5,696,965 A | 12/1997 | Dedrick |
| 5,703,949 A | 12/1997 | Rosen |
| 5,708,780 A | 1/1998 | Levergood et al. |
| 5,710,884 A | 1/1998 | Dedrick |
| 5,712,989 A | 1/1998 | Johnson et al. |
| 5,715,314 A | 2/1998 | Payne et al. |
| 5,721,780 A | 2/1998 | Ensor et al. |
| 5,724,424 A | 3/1998 | Gifford |
| 5,724,521 A | 3/1998 | Dedrick |
| 5,727,164 A | 3/1998 | Kaye et al. |
| 5,732,219 A | 3/1998 | Blummer et al. |
| 5,734,719 A | 3/1998 | Tsevdos et al. |
| 5,761,662 A | 6/1998 | Dasan |
| 5,768,142 A | 6/1998 | Jacobs |
| 5,768,521 A | 6/1998 | Dedrick |
| 5,771,354 A | 6/1998 | Crawford |
| 5,774,670 A | 6/1998 | Montulti |
| 5,784,565 A | 7/1998 | Lewine |
| 5,787,416 A | 7/1998 | Tabb et al. |
| 5,790,793 A | 8/1998 | Higley |
| 5,806,077 A | 9/1998 | Wecker |
| 5,812,776 A | 9/1998 | Gifford |
| 5,819,092 A * | 10/1998 | Ferguson et al. ............. 717/113 |
| 5,826,241 A | 10/1998 | Stein et al. |
| 5,826,242 A | 10/1998 | Montulli |
| 5,842,185 A | 11/1998 | Chancey et al. |
| 5,848,399 A | 12/1998 | Burke |
| 5,848,413 A | 12/1998 | Wolff |
| 5,870,552 A | 2/1999 | Dozier et al. |
| 5,895,454 A | 4/1999 | Harrington |
| 5,897,622 A | 4/1999 | Blinn et al. |
| 5,909,492 A | 6/1999 | Payne et al. |
| 5,913,040 A | 6/1999 | Rakavy et al. |
| 5,920,847 A | 7/1999 | Kolling et al. |
| 5,982,891 A | 11/1999 | Ginter et al. |
| 5,999,711 A | 12/1999 | Misra et al. |
| 6,006,199 A | 12/1999 | Berlin et al. |
| 6,023,683 A | 2/2000 | Johnson et al. |

(56) References Cited

U.S. PATENT DOCUMENTS

| | | | |
|---|---|---|---|
| 6,041,316 A | 3/2000 | Allen | |
| 6,049,785 A | 4/2000 | Gifford | |
| 6,125,388 A | 9/2000 | Reisman | |
| 6,134,592 A | 10/2000 | Montulli | |
| 6,135,646 A | 10/2000 | Kahn et al. | |
| 6,148,343 A | 11/2000 | Lewine | |
| 6,175,921 B1 | 1/2001 | Rosen | |
| 6,182,052 B1 | 1/2001 | Fulton et al. | |
| 6,195,649 B1 | 2/2001 | Gifford | |
| 6,199,051 B1 | 3/2001 | Gifford | |
| 6,205,437 B1 | 3/2001 | Gifford | |
| 6,230,202 B1 | 5/2001 | Lewine | |
| 6,249,865 B1 | 6/2001 | Walker et al. | |
| 6,449,599 B1 | 9/2002 | Payne et al. | |
| 6,507,872 B1 | 1/2003 | Geshwind | |
| 6,594,692 B1 | 7/2003 | Reisman | |
| 6,684,333 B1 | 1/2004 | Walker et al. | |
| 6,708,157 B2 * | 3/2004 | Stefik et al. | 705/59 |
| 5,708,780 C1 | 4/2006 | Levergood et al. | |
| 5,909,492 C1 | 8/2007 | Payne et al. | |
| 7,272,639 B1 | 9/2007 | Levergood et al. | |
| 5,715,314 C1 | 10/2007 | Payne et al. | |
| 7,272,639 C1 | 10/2011 | Levergood et al. | |
| 7,272,639 C2 | 2/2013 | Levergood et al. | |
| 2006/0095526 A1 | 5/2006 | Levergood et al. | |
| 2008/0109374 A1 | 5/2008 | Levergood et al. | |
| 2008/0201344 A1 | 8/2008 | Levergood et al. | |

FOREIGN PATENT DOCUMENTS

| | | |
|---|---|---|
| EP | 0456920 | 11/1991 |
| EP | 0542298 B1 | 5/1993 |
| EP | 0542298 B1 | 5/1993 |
| EP | 0 645 688 | 3/1995 |
| EP | 0645688 | 3/1995 |
| GB | 2102606 | 2/1983 |
| JP | 3278230 | 12/1991 |
| JP | 410191 | 1/1992 |
| JP | 05-158963 | 6/1993 |
| JP | 5274275 | 10/1993 |
| JP | 6162059 | 6/1994 |
| JP | 6291776 | 10/1994 |
| WO | WO 91/16691 | 10/1991 |
| WO | WO 93/10503 | 5/1993 |
| WO | WO 94/03859 | 2/1994 |
| WO | WO 95/16971 | 6/1995 |
| WO | WO 96/42041 | 12/1996 |

OTHER PUBLICATIONS

Jong-Gyun Lim, Using Coollists to Index HTML Documents in the Web, Second International World Wide Web Conf, Oct. 1994, 8 pages.*
Jeff Sedayao, "Mosaic Will Kill My Network!"—Studying Network Traffic Patterns of Mosaic Use, Second International World Wide Web Conf, Oct. 1994, 7 pages.*
Lara D. Catledge et al., Characterizing Browsing Strategies in the World-Wide Web, Third International World Wide Web Conf, Apr. 1995, 10 pages.*
Jose Kahan, A capability-based authorization model for the Worl-Wide Web, The Third International World-Wide Web conference, Apr. 1995, 14 pages.*
Brian W. Kernighan and Dennis M. Ritchie, "The C Programming Language" second edition, AT & T Bell Laboratories, (N.J., Prentice Hall) pp. 17-21 (1988).
Computer and Business Equipment Manufacturers Association, "American National Standard for Information Systems—Database Language SQL" (N.Y., American National Standards Institute) pp. 27-28 (1986).
Deposition of G. Winifield Treese, dated Oct. 27, 2004.
Deposition of Glenn Arthur Hauman with Exibits (Oct. 28, 2004).
Joint Claim Construction Chart (Patent Local Rule 4-5D)), filed Dec. 27, 2004 with Appendix A.
Memorandum Opinion dated Apr. 7, 2005.
Motion to Stay [Renewed] by Amazon.com. (Attachments: # 1 Affidavit # 2 Text of Proposed Order)(Nelson, Justin) (Entered: Apr. 5, 2005).
Notice by Amazon.com re Answer to Amended Complaint, Counterclaim of Rejection of Claims 1-45 of U.S. Patent No. 5,708,780.
Soverain's Disclosure of Asserted Claims and Preliminary Infringement Contentions dated Jun. 3, 2004.
Soverain's Reply to Amazon.Com's Amended Counterclaims, dated Jan. 14, 2005.
Soverain's Answer to Counterclaim (Amazon's Third Amended Counterclaim) by Soverain Software LLC.(Seraphine, Jennifer) (Entered: Mar. 17, 2005).
Soverain'Fourth Supplemental Responses to Amazon's First Set of Interrogatores (Nos. 1-14) dated Mar. 21, 2005.
Soverain's Responses to Amazon's First Set of Requests for Admission to Plaintiff Soverain Software (Nos. 1-100) dated Mar. 21, 2005.
Soverain's Responses to Interrogatory Nos. 22, 23, 26 and 36 of Amazon's Thirs Set of Interrogatores (Nos. 17-30) dated Mar. 21, 2005.
Third Supplement to Defendent Amazon's Initial Disclosures, dated Mar. 4, 2005.
Transcript of the Markmam Hearing Before the Honarable Leonard David United States District Judge, Jan. 6, 2005.
VideoTaped Deposition of Andrew Payne dated Mar. 11, 2005.
Videotaped Deposition of Glenn Crocker with Exibits (Mar. 10, 2005).
VideoTaped Deposition of Glenn Trewitt Jan. 25, 2005 (2 parts).
VideoTaped Deposition of Mark Levergood dated Mar. 8, 2005 (2 Parts).
VideoTaped Deposition of Stephen Morris dated Mar. 9, 2005.
Deposition of Glenn M. Trewitt with Exhibits (Jan. 25, 2005).
Deposition of Joshua Smith with Exhibits (Mar. 2, 2005).
Deposition of Michael Lazzaro with Exhibits (Mar. 9, 2005).
Deposition of Thomas Soulanille with Exhibits (Mar. 14, 2005).
Exhibit 2 of Geringer Declaration: E-mail from Brooks Cutter to Mike Kuniavsky (Jun. 14, 1994).
Exhibit 6 of Geringer Declaration: E-mail from Andrew Payne to Winfield Treese, et al. (Jun. 15, 1994).
Supplemental Dislcosure of Preliminary Invalidity Contentions by Amazon and Gap dated Jul. 26, 2004.
Videotaped Deposition of Guy Henry Timothy Haskin with Exhibits (Mar. 18, 2005).
Videotaped Deposition of Kevin Ming-Wei Kadaia Hughes with Exhibits (Mar. 21, 2005).
Videotaped Deposition of Michael Kuniavsky with Exhibits (Feb. 22, 2005).
Videotaped Deposition of Phillip Hallam-Baker Exhibits (Mar. 11, 2005).
Videotaped Deposition of Robert Allen Olson with Exhibits (Mar. 3, 2005).
"CompuServe Videotex Network Offers Marketing Research Service, Ad Test." Marketing News, Nov. 25, 1983, p. 21.
"Electronic In-Home Shopping: "Our Stores are Always Open"," Chain Store Age Executive, Mar. 1985, pp. 111,116.
"Mail Offers Holiday Treat for Hackers." Advertising Age, Nov. 13, 1985, p. 76.
"Redcoats Join Communications Fight," Industry Week, Feb. 22, 1982, pp. 108-109.
"Suddenly, Videotex is Finding an Audience," Business Week, Oct. 19, 1987, pp. 92-94.
"Taking Adbantage of the Past," Advertising Age, Apr. 11, 1983, pp. M36-M37.
Allen & Hamilton, How to Buy information with a First Virtual Account, Apr. 11, 1994, pp. 3-71.
American National Standard; "Financial Institution Retail Message Authentication"; ANSI X9, 19: 1986.
American National Standard; "Interchange Message Specification for Debit and Credit Card Message Exchange Among Financial Institutions"; ANSI X9.2: 1988.
Bender, M.; "EFTS: Electronic Funds Transfer Systems"; Kennikat Press: Port Washungton, New York: pp. 43-46: 1975.

(56) References Cited

OTHER PUBLICATIONS

Beutelspacher, et al, "Payment Applications with Multifunctional Smart Cards," Smart Card 2000: The Future of IC Cards, Oct. 1987. pp. 95-101.
Bos et al.; "SmartCash: A Practical Electronic Payment System"; pp. 1-8; Aug. 1990.
Burk et al.; "Value Exchange Systems Enabling Security and Unobservability"; Computers & Security, 9; pp. 715-721; 1990.
Burk, et al, "Digital Payment Systems Enabling Security and Observability," Computers & Security, 1989, pp. 398-415.
Case Study: The CIRRUS Banking Network; Comm. ACM 8, 28' pp. 797-8078; Aug. 1985.
CCITT Blue Book, vol. VIII: pp. 48-81, Nov. 14-25, 1988.
Chaum et al.; "Untraceable Electronic Cash"; Advances in Cryptology; pp. 319-327; 1988.
Cohen, Danny; "Computerized Commerce"; ISI Reprint Series IS/RS-89-243; Oct. 1989; Reprinted from Information Processing 89, Proceedings of the IFIP World Computer Congress, held Aug. 28-Sep. 1, 1989.
Cohen, Danny; "Electronic Commerce"; University of Southern California Information Sciences Institute, Research Report ISI/RR-89-244; Oct. 1989.
Compuserve International: Compuserve Information Service Users Guide: pp. 109-114: 1986.
Computer Fraud & Security Bulletin. "Underlying Security Mechanisms," Mar. 1997.
Computer Shopper "Internet for Profit": pp. 180-182, 187, 190-192, 522-528, 532, 534: Nov. 1994.
Consumers Plugging Into New Electronic Mail. Advertising Age, Mar. 4, 1985. p. 74.
Damgard, "Payment Systems and Credential Mechanisms with Provable Security Against Abuse by Individuals," Advances in Cryptology—CRYPTO '88, 1988, pp. 328-325.
Davies, D.W. and Price, W.L.; "Security for Computer Networks: An Introduction to Data Security in Teleprocessing and Electronic Funds Transfer": John Wiley & Sons: Dec. 5, 1985; pp. 304-336.
Dukach, Semvon: "SNPP: A Simple Network Payment Protocol"; MIT Laboratory for Computer Science: Cambridge.
Even et al.; "Electronic Wallet"; pp. 383-386; 1983.
Ferrarini, "Direct Connections for Software Selections," Business Computer Systems, Feb. 1984, pp. 35-38.
Fujioka, et al. "ESIGN: An Efficient Digital Signature Implementation for Smart Cards," Advances in Cryptology-Eurocrypt '91, Apr. 1991, pp. 446-457.
Gifford, David K.; "Cryptographic Sealing for Information Secrecy and Authentication"; Stanford University and Xerox Palo Alto Research Center; Communications of the ACM; vol. 25, No. 4; Apr. 1982.
Hakola, et al, "A System for Automatic Value Exchange," Proceedings—Fall Joint Computer Conference, 1968, pp. 579-589.
Harty et al.; "Case Study: The VISA Transaction Processing System"; 1988.
Information Network Institute, Carnegie Mellon University; Internet Billing Server; Prototype Scope Document; Oct. 14, 1993.
International Organization for Standardization; "International Standard: Bank Card Originated Messages—Interchange Message Specifications—Content for Financial Transactions": ISO 8583: 1987.
Jansson, Lennart; "General Electronic Payment System"; 7th Proceedings of the International Conference on Computer Communication: pp. 832-837: 1985.
Kenny, "EDI Security: Risks and Solutions," COMPSEC 1992; The Ninth World Conference on Computer Security, Audit, and Control, Nov. 1992, pp. 341-352.
Knapskog, Privacy Protected Payments—Realization of a Protocol That Guarantees Payor Anonymity, Advances in Cryptology—Eurocrypt '88, May 1988, pp. 107-122.
Krajewski, M. et al.; "Applicability of Smart Cards to Network User Authentication"; Computing Systems; vol. 7, No. 1; 1994.
Krajewski, M.; "Concept for a Smart Card Kerberos"; 15th National Computer Security Conference; Oct. 1992.
Krajewski, M.; "Smart Card Augmentation of Kerberos"; Privacy and Security Research Group Workshop on Network and Distributed System Security; Feb. 1993.
Lai et al., "Endorsements, Licensing, and Insurance for Distributed System Services", Information Sciences Institute Univ. of Southern CA., Assoc. for Computing Machinery 1994.
Medvinsky et al.; "Electronic Currency for the Internet"; Electronic Markets; pp. 30-31, Sep. 1993.
Medvinsky et al.; "NetCash: A Design for Practical Electronic Currency on the Internet"; Proc. 1st ACM Conf. on Comp. and Comm. Security; Nov. 1993.
Messmer, "NIST Stumbles on Proposal for Public Key Encryption," Network World, Jul. 27, 1992, p. 1.
Hirschfeld Rafael "Making Electronic Refunds Safer"; Sections 1, 2, 4, and 6, 1992.
Needham, Roger M., "Adding Capability Access to Conventional File Servers"; Xerox Palo Alto Research Center; Palo Alto, California; no date.
Okamoto et al.; "Universal Electronic Cash"; pp. 324-337; 1991.
P. Remeery et al., "Le Palement electronique", pp. 15-23, 1988, L'Echo des Recherches, No. 134.
Perry, "Electronic Banking Goes to Market." IEEE Spectrum, Feb. 1988, pp. 46-49.
Pfitzmann et al.; "How to Break and Repair a 'Provably Secure' Untraceable Payment System"; pp. 338-350; 1991.
Ph. van Heurck, "TRASEC: Belgian Security System for Electronic Funds Transfers," Computers & Security, 1987, pp. 261-268.
Pongratz, et al. "IC Cards in Videotex Systems," Smart Card 2000, 1989, pp. 179-188.
Schamuller-Bichl. I.; "IC-Cards in High-Security Applications"; Selected Papers from the Smart Card 2000 Conference; Springer Verlag; pp. 177-199; 1991.
Shain, "Security in Electronic Funds Transfer System," Computers & Security, 1989, pp. 123-137.
Sirbu, Marvin A.; "Internet Billing Service Design and Prototype Implementation"; An Internet Billing Server; pp. 1-19; 1993.
Staskauskas, "The Formal Specification and Design of a Distributed Electronic Funds Transfer System," IEEE Transactions on Computers. Dec. 1998, pp. 1515-1528.
Stol, Privacy Protected Payments-A Possible Structure for a Real Implementation and Some Resource Considerations, Feb. 1998.
Strazewski. "Computerized Service Sets Shoppers Hacking," Advertising Age, Feb. 22, 1988, p. 62.
Takei, "Videotex Information System and Credit System Connecting with MARS-301 of JNR," Japanese Railway Engineering, No. 94, Sep. 1985, pp. 9-11.
Tanaka, et al, "Untraceable Electronic Funds Transfer System," Electronics and Communications in Japan, 1989, pp. 47-54.
Tunstall, "Electronic Currency," Smart Card 2000: The future of IC Cards, Oct. 1987, pp. 47-48.
Viescas, "Official Guide to the Prodigy Service" 1991.
Vittal, J. "Active Message Processing: Messages as Messengers"; pp. 175-195; 1981.
Waidner, et al, "Loss-Tolerance for Electronic Wallets," Fault-Tolerant Computing: 20th International Symposium, Jun. 1990. pp. 140-147.
Weber, "Controls in Electronic Funds Transter System," Computers & Security, 1989, pp. 209-221.
Williams, "Debit Program Cuts Fraud; CompuServe Plan a Success," Pensions & Investment Age, Feb. 4. 1985, pp. 21-32.
"Announcing: Internet Shopkeeper" (Aug. 2, 1994) posting on comp. infosystems.www and misc.forsale.
Net Market (""Numerous News Media Stories"" (Apr. 1994)) NY Times, front page of bus.
"What's New," http://archive.ncsa.uluc.edu/SDG/Software/Mosaic/Docs/old-whats-new/whats-new-0294.html.
Archive of WWWorder mailing list (Jun. 18, 1994-Jun. 13, 1994).
Ariel Poler I/PRO, 2nd WWW_Conference Chicago IL (Oct. 1994) (Presentation).
Aronson, Dan, et al., Electronic Mail to multiple recipients of the www-talk list (www-talk@info.cern.ch) on "Access and session control" dated Sep. 15, 1994.

(56) References Cited

OTHER PUBLICATIONS

Batelaan; Butler, Chan; Chen; Evenchick; Hughes; Jen; Jeng; Millett; Riccio; Skoudis; Starace; Stoddard; "An Internet Billing Server Prototype Design"; Carnegie Mellon University; 1992.

Berners-Lee, T. "draft-ietf-liir-http-00.txt" (Nov. 5, 1993).

Berners-Lee, T., et al., http://www.ietf.org/rfc/rfc1738.txt?numbers=1738, Dec. 1994, 25 pages.

Biznet Technologies, Versatile Virtual Vending, published at http://www.bnt.com (Sep. 12, 1994).

Buhle, Jr., E. Loren, "Wide Area Info Services," Digital Systems J., Sep.-Oct. 1994, p. 13.

Business Wire, Jun. 26, 1995, "CommerceNet Urges Government to Ease Export Restrictions on Encryption Products; Consortium's New White Paper Articulates Position on the Export of Cryptography Based Products".

Comer, D., et al., "The Tilde File Naming Scheme," pp. 509-514, 6th International Conference on Distributed Computing Systems, IEEE Comp. Society, Cambridge NH May 1986.

Comer, D.E., et al., "A Model of Name resolution in Distributed Systems," pp. 520-530, 6th International Conference on Distributed Computing Systems, IEEE Comp. Society, Cambridge NH, May 1986.

Crocker, Glenn, "web2mush: Serving Interactive Resources to the Web," Electronic Proc. of the 2nd World Wide Web Conf. '94: Mosaic and the Webl, Developers Day, (Oct. 20, 1994).

Derler, Christian, "The World-Wide Web Gateway to Hyper-G: Using a Connectionless Protocol to Access Session-Oriented Services", Institut für Informationsverarbeitung and Computergestützte neue Medien, Graz, Austria, dated Mar. 1995.

Dukach, Seymon; Prototype Implementation of the SNPP Protocol; allspic.lcs.mit.edu; 1992.

English, Joe, Electronic Mail to multiple recipients of the www-talk list (www-talk@info.cern.ch) on "Re: Identifying Mosaic session" dated Dec. 20, 1994.

Ferrarini, E., "Flight of Fancy: Goodbye Travel Agent", Business Computer Systems, vol. 2, No. 11, pp. 39-40, Nov. 1993.

Fielding, Roy, et al., "Principled Design of the Modern Web Architecture" ACM Transactions on Internet Technology 2, 2 pp. 115-150 (May 2002).

Fielding, Roy, software distribution archive for the HTTP log file analysis program, wwwstat v1.01, dated Apr. 24, 1994, published at http://www.ics.uci.edu/WebSoft/wwwstat/.

Foster, David & Stuart Finn, "Insurers Can Benefit From E-Mail Networks", National Underwriter Property & Casualty-Risk & Benefits Management No. 9, p. 46(2), Mar. 4, 1991.

Gifford, Stewart. Payne, Treese, "Payment Switches for Open Networks," presented at 40th IEEE, IEEE, COMPCON '95, Mar. 5-9, 1995, San Francisco, CA.

Hall, Devra, et al., "Build a Web Site: The Programmers Guide to Creating, Building, and Maintaining a Web Presence", published Apr. 1995. ISBN 0-7615-0064-2.

Hughes, Kevin, source code file for the HTTP log file analysis program, getstats v1.0, dated Feb. 1, 1994, published at http://eit.com/software/getstats/getstats.html—Version 1, 64 pages.

Hughes, Kevin, source code file for the HTTP log file analysis program, getstats v1.0, dated Feb. 1, 1994, published at http://eit.com/software/getstats/getstats.html—Version 2, 64 pages.

It will happen, article excerpt from infoHighway, vol. 2-1, Jan. 1995.

Leggett, John et al., "Hyperform: Using Extensibility to Develop Dynamic, Open and Distributed Hypertext Systems" (1992).

Maren, Michael, "The Age of E-Mail," Home Office Computing, vol. 11, No. 12, p. 63(5), Dec. 1993.

McCartney, Todd, Message posted to Usenet public discussion group, rec.arts.disney, dated Nov. 21, 1994.

NCSA HTTPd release notes at http://hoohoo.ncsa.uiuc.edu/docs/Upgrade.html (last updated Aug. 1, 1995).

Nielson, Jacob, Hypertext & Hypermedia (1990).

O'Mahony, Donald, Michael Peirce, & Hitesh Tewari, Electronic Payment Systems, Artech House, Inc., pp. 145-155, Jan. 1997.

Pitkow, et al., "Results from the First World Wide Web Use Survey", presented at the First International Conference on the World Wide Web, Geneva, Switzerland, May 25-27, 1994, published at http://www94.web.cern.ch/WWW94/PrelimProcs.html on Jun. 2, 1994, and reprinted in the Journal of Computer Networks and ISDN Systems, vol. 27, No. 2., Nov. 1994, Elsevier Science B.V.

Smithson, Brain, and Singer, Barbara, An Information Clearinghouse Server for Industry Consortia, 2nd Int'l Conf. on the World Wide Web, Chicago, Ill., Oct. 1994.

Stallings, William, Data & Computer Communications, MacMillan Publishing, 1985, pp. 245-252.

The Major BBS: Collection of information and Advertisements concerning the Major BBS (Fall 1993).

The NetMarket Company, NetMarket PGP Help file, from http://www.netmarket.com, dated Dec. 10, 1994.

Trewitt, Glenn, "Using Tcl to Process HTML Forms", Digital Equipment Corporation, Network Systems Laboratory TN-14, dated Mar. 1994.

Trip et al., "Cookies" (client-side persistent information) and their use, Netscape Technical Note 20019, Netscape Communications Corp., Oct. 1995.

www talk mailing list: Troth message Sep. 15, 1994.

Bina, E., et al., "Secure Access to Data Over the Internet," 1994 IEEE, pp. 99-102.

Kiuchi, T., et al., "C-HTTP—The Development of a Secure, Closed HTTP-based Network on the Internet," 1996 IEEE, pp. 64-75.

Berners-Lee, T., et al., http://www.ietf.org/rfc/rfc1738.txt?number-1738 ', Dec. 1994, 25 pages.

Freeman-Benson, Bjorn N., "Using the Web to Provide Private Information," First International Conference on the World Wide Web, WWW94, May 1994, 5 pages.

Gifford, David K., "Notes on Community Information Systems," MIT/LCS/TM-419, Dec. 10, 1989, pp. 1-5.

Chaum, D., "Achieving Electronic Privacy," *Scientific American*, Aug. 1992, pp. 96-101.

Neuman, B. C., "Proxy-Based Authorization and Acounting for Distributed Systems," *Proceedings on the 13th International Conference on Distributed Computing Systems*, Pittsburgh, May 1993.

Anderson, R., "Why Cryptosystems Fail," *1st Conf.—Computer & Comm. Security*, 1993-Nov. 1993—VA, USA, pp. 215-227.

Abadi, M., et al., "Authentication and Delegation with Smart-cards," Oct. 1990.

Rivest, R., "The MD5 Message-Digest Algorithm," *MIT Laboratory for Computer science and RSA Data Security, Inc.*, Apr. 1992.

Voydock, V., et al., "Security Mechanisms in High-Level Network Protocols," *Computing Surveys*, vol. 15, No. 2, Jun. 1983, pp. 135-171.

Gligor, V.D., "Object Migration and Authentication," *IEEE Transactions on Software Engineering*, vol. SE-5, No. 6, Nov. 1979, pp. 607-611.

Chaum, D.L., et al., "Implementing Capability-Based Protection Using Encryption," *Electronics Research Laboratory*, Jul. 1978, pp. 1-10.

Rescorla, E., et al., "The Secure HyperText Transfer Protocol," *Enterprise Integration Technologies*, Jun. 1994.

Rescorla, E., et al., "The Secure HyperText Transfer Protocol," *Enterprise Integration Technologies*, Dec. 1994.

Bellcore Internal E-Mail, Nov. 24, 1993.

Netscape Products, "Open and Secure Internet Software," *Internet*, Sep. 18, 1995, pp. 1-2.

Merchant System: Overview, "Netscape Merchant System Data Sheet," *Internet*, Sep. 18, 1995, pp. 1-3.

Internet Applications Customer Showcase, "Customer Showcase," *Internet*, Sep. 18, 1995, pp. 1-2.

The Server-Application Function and Netscape Server API, "The Netscape Server API Netscape Products," *Internet*, Sep. 18, 1995, pp. 1-11.

The Object-Oriented Paradigm of Server Configuration, "The Object-Oriented Paradigm of Server Configuration," *Internet*, Sep. 18, 1995, pp. 102.

Verisign Redirection Information, "Important Accouncement," *Internet*, Sep. 18, 1995, p. 1.

(56) References Cited

OTHER PUBLICATIONS

PR: Digital IDs for Open Market's Secure WebServer, "Press Release, VeriSign, Inc. to Provide Digital IDs for Open Market's Secure WebServer," *Internet*, Sep. 18, 1995, pp. 1-2.
PR: Online Security Solutions, "VeriSign, Inc. Adds the Missing Component to Online Security Solutions" *Internet*, Sep. 18, 1995, pp. 1-2.
The SSL Protocol, Internet, Sep. 18, 1995, pp. 1-18.
Istore, "Netscape Istore Data Sheet," *Internet*, Sep. 18, 1995, pp. 1-2.
Ramanathan, Srinivas, et al., "Architecture for Personalized Multimedia," *IEEE Multimedia*, vol. 1, No. 1, Computer Society, pp. 37-46, 1994.
Choudhury, Abhijit K., et al., "Copyright Protection for Electronic Publishing Over Computer Networks," *IEEE Network, The Magazine of Computer Communications*, vol. 9, No. 3, p. 12-20, May 1995.
"Cookies and Privacy FAQ," http://search.netscape.com/assist/security/faqs/cookies.html Jan. 9, 1998 at 4:29 p.m.).
"Persistent Client State HTTP Cookies," http://search.netscape.com/newsref/std/cookie_spec.html (Jan. 9, 1998 at 4:28 p.m.).
"HTTP State Management Mechanism," http://www.internic.net/rfc/rfc2109.txt (Jan. 9, 1998 at 4:30 p.m.).
Pitkow, J.E., and Recker, M.M., "Using the Web as a Survey Tool: Results from the Second WWW User Survey," ,1995, http://www.igd.fhg.de/www/www95/papers/79/survey/survey_2_paper.html.
Peterson, Larry L., "A Yellow-Pages Service for a Local-Area Network," ACM Proceedings of the ACM SIGCOMM 87 Workshop, ACM Press, 1988, pp. 235-242.
Kahan, Jose, "A Distributed Authorization Model for WWW," 1995, http://www.isoc.org/HMP/PAPER/107/html/paper.html, pp. 1-16.
Kahan, Jose, "A capability-based authorization model for the World-Wide Web," http://www.igd.fhg.de/archive/1995_www95/proceedings/papers/86/CAMWWW.html, pp. 1-14, 1995.
Anderson, Scott, et al., "Sessioneer: Flexible level Authentication with Off the Shelf Servers and Clients," http://www.igd.fhg.de/archive/1995_www95/papers/77/sessioneer2.html, pp. 1-7, 1995.
Kahan, Jose, "Un nouveau modele d'autorisation pour les systemes de consultation d'information multimedia repartie," pp. 45-57, 1995.
Kahan, Jose, "A New Authorization Model for Distributed Multimedia Information Consultation Systems," English Translation, pp. 1-21, 1995.
*Soverain Software LLC* v. *Amazon.Com, Inc.* and The Gap, Inc., Form of Stipulated Request for Final Dismissals of the Actions, filed Aug. 30, 2005.
*Soverain Software LLC* v. *Amazon.Com, Inc.* and *The Gap, Inc.*, Order of Dismissal with Prejudice filed Aug. 31, 2005.
Farber, David, "Interesting-People Message—RSA/NCSA/EIT Announcement on Secure Mosiac" Palo Alto, California, Apr. 12, 1994, 4 pages.
Kent, Stephen T., "Internet Privacy Enhanced Mail", 8070 Communications of the ACM 36, New York, Aug. 1993, pp. 48-60.
Kohn, Dan, "Prior Art on Open Market Patents", e-mail message dated Mar. 9, 1998, 1 page.
Lewis, Peter H., "Attention Shoppers: Internet Is Open", 2 pages.
Medvinsky et al., NetCash: A Design for Practical Elecronic Currency on the Internet, Information Sciences Institute, University of Southern California, 1993, pp. 102-106.
Schaefer et al., "Networked Information Discovery and Retrieval Tools: Security Capabilities and Needs", The MITRE Corporation, 1994, pp. 145-153.
"Here it is, World" internet postings to comp.infosystems.www.users discussion list re: Mosaic Netscape (Oct. 13, 1994-Oct. 17, 1994) available at: http://groups.google.com/group/comp.Infosystems.www.users/browse_thread/thread/3666fe4e21b3a9e2/9a210e5f72278328?lnk=st&rnum=5&hl=en#9a210e5f72278328.
"Netscape 0.93 Setup Questions" internet postings to comp.infosystems.www.misc discussion list re: Mosaic Netscape (Nov. 21, 1994-Nov. 25, 1994) available at: http://groups.google.com/group/comp.infosystems.www.misc/browse_thread/thread/da4e82efc6512f.67/8dabc347291409d5?lnk=st&rnum=1&hl=en#8dabc347291409d5.

"Netscape and Cookies" internet postings to comp.infosystems.www.users discussion list re: Mosaic Netscape (Dec. 11, 1994-Dec. 13, 1994) available at: http://groups.google.com/group/comp.infosystems.www.users/browse_thread/thread/5347cb89bbae572b/3583cab5e6c13e94?lnk=st&rnum=3&hl=en#3583cab5e6c13e94.
"Cookies.txt" internet postings to comp.infosystems.www.users discussion list re: Mosaic Netscape (Dec. 23, 1994-Dec. 27, 1994) available at: http://groups.google.com/group/comp.infosystems.www.users/browse_thread/thread/613e81948e9cf6e4/134ade72dfc1c58d?lnk=st&rnum=2&hl=en#134ade72dfc1c58d.
"How to get statefull HTML documents" internet postings to comp.infosystems.www.misc discussion list (Jun. 24, 1994-Jun. 25, 1994) available at: http://groups.google.com/group/comp.infosystems.www.misc/browse_thread/thread/fd304fedb645529a/b8f6dab2aa73ae71?lnk=st&rnum=7&hl=en#b8f6dab2aa73ae71.
"How to add state info to a form" internet postings to comp.infosystems.www.providers discussion list (Jun. 30, 1994-Jul. 1, 1994) available at: http://groups.google.com/group/comp.infosystems.www.providers/browse_thread/thread/2acad6cdc8ebb8a/bf368e630add2c94?lnk=st&rnum=8&hl=en#bf368e630add2c94.
"Transactional Services on WWW" internet postings to comp.infosystcms.www discussion list (May 12, 1994-Jun. 1, 1994) available at: http://groups.google.com/group/comp.infosystems.www/browse_thread/thread/bf430e6df8e6e7d/8ed77a97f5d0b9d6?lnk=st&hl=en#8ed77a97f5d0b9d6.
Dan Aronson, "access and session control" posting to www-talk discussion list (Sep. 14, 1994) available at: http://1997.webhistory.org/www.lists/www-talk.1994q3/0901.html.
Rick Troth, "access and session control" (Sep. 15, 1994) available at: http://1997.webhistory.org/www.lists/www-talk.1994q3/0923.html.
alain@hyperman.co.il, "Identifying Mosaic session" posting to www-talk discussion list (Dec. 20, 1994) available at http://1997.webhistory.org/www.lists/www-talk.1994q4/1098.html.
Joe English, "Re: Identifying Mosaic session", posting to www-talk discussion list (Dec. 20, 1994 available at: http://1997.webhistory.org/www.lists/www-talk.1994q4/1109.html.
Steven Majewski, "Identifying Mosaic session" posting to www-talk discussion list (Dec. 20, 1994) available at: http://1997.webhistory.org/www.lists/www-talk.1994q4/1111.html.
Nick Arnett, "Statelessness" posting to www-talk discussion list (May 16, 1994) available at: http://1997.webhistory.org/www.lists/www-talk.1994q2/0562.html.
Jared Rhine, "Statelessness" posting to www-talk discussion list (May 16, 1994) available at: http://1997.webhistory.org/www.lists/www-talk.1994q2/0563.html.
Simon Spero, "Statelessness" posting to www-talk discussion list (May 17, 1994) available at: http://1997.webhistory.org/www.lists/www-talk.1994q2/0579.html.
Jim McBeath, "Statelessness" posting to www-talk discussion list (May 27, 1994) available at: http://1997.webhistory.org/www.lists/www-talk.1994q2/0683.html.
Phillip Hallam-Baker, "Statelessness" posting to www-talk discussion list (May 30, 1994) available at: http://1997.webhistory.org/www.lists/www-talk.1994q2/0705.html.
Bina, E., et al., "Secure Access to Data Over the Internet," 1994 IEEE. pp. 99-102.
Kiuchi, T., et al., "C-HTTP-The Development of a Secure, Closed HTTP-Based Network on the Internet," 1996 IEEE, pp. 64-75.
Bemers-Lee, T, et al., "Target a Common Internet Syntax Where the User Password is Appended to a Specific URL," http//www.ietf.org/rfc/rfc1738.txt?number=1738.
57 USPQ2D, "*Amazon.com, Inc.* v. *Barnesandnoble.com, Inc.*" pp. 1746-1763.
Pitkow, J.E., "Webviz: A Tool for World-Wide Web Access Log Analysis" First International World Wide Web Conf., May 1994, 7 pgs.
Lim, Jong-Gyun, "Using_Coollists to Index HTML Documents in the Web." http://www.ncsa.uiuc.edu/SDG/TT94/Proceedings/Searching/lim/coollist. htm, pp. 1-8.
Sedayao, J., "Mosaic Will Kill My Network!—Studying Network Traffic Patterns of Mosaic Use", http://www.ncsa.uiuc.edu/SDG/TT94/P...gs/DDay/sedayao/mos_traf_paper.htm.

(56) References Cited

OTHER PUBLICATIONS

Catiedge, L.D., "Characterizing Browsing Strategies in the World-Wide Web," http:www.igd.thg,de/archive/1995_.../UserPatterns.Paper4.formatted.htm.

Menefee, C. "New host for Internet Commercial Site Index," Newsbytes Nov. 9, 1994, p. 15.

Michalski, J., "Content in context: the Future of. SGML and HTML," Release 1,0, Sep. 27, 1994, pp. 1-10.

Metcalf, R.M., "Commercialization of the Internet Opens Gateways to Interpreneurs," InfoWorld, Aug. 8, 1994 p. 44.

"maX.500-a Macintosh X.500 Directory Client", contents of WWW website, http://www.umich.edu/-dirsvcs/ldap/max500/index.htlm as of Jul. 7, 1997.

Droms, R.E., "Access to Heterogenous Directory Services," Proceedings IEEE INFOCOM '90, pp. 1054-1061, San Francisco, CA, Jun. 3-7, 1990.

Good, B., "Experience with Bank of America's Distributive Computing System," pp. 2-8, IEEE 1983.

Inselberg, A., "An Approach to Successful Online Transaction Processing Applications," AFIPS Conference Proceedings, 1985 National Computer Conference, pp. 419-427, Chicago, IL, Jul. 15-18, 1985.

Bowman, et al., "Univers: An Attribute-Based Name Server," Software Practice and Experience, vol. 20(4) 403-424, Apr. 1991.

Housel, B.G., et al., SNA Distribution Services, IBM Systems Journal pp. 319.343, vol. 22, No. 4, (1993).

Zatti, et al., "Naming and Registration for IBM Distributed Systems," IBM Systems Journal, pp. 353-380, vol. 31, No. 2, 1992.

Welch, B., et al., "Prefix Tables: A Simple Mechanism for Locating Files in a Distributed System," pp. 184-189, 6$^{th}$ International Conference on Distributed Computing Systems, IEEE Computer Society, Cambridge, MA. May 1996.

Schwartz, et al., "A Name Service for Evolving, Heterogeneous Systems," Proceedings of the 11$^{th}$ ACM Symposium on Operating Systems Principles, vol. 21, No. 5, pp. 52-62, Austin TX, Nov. 1987.

Hitchens, M., et al., "Bindings Between Names and Objects in a Persistent System." Proceedings of the 2$^{nd}$ International Workshop on Object Orientation in Operating Systems, IEEE Computer Society, pp. 26-37, Dourdan, FR, Sep. 1992.

Sheltzer, et al., "Name Service Locality and Cache Design in a Distributed Operating System," University of California, Los Angeles, 8 pgs.

Andrade, et al., "Open On-Line Transaction Processing with the TUXEDO System," pp. 366-371. Digest of Papers, IEEE Computer Society Press, COMPSON Spring 1992, San Francisco, California.

Terry, D.B., "Structure-free Name Management for Evolving Distributed Envrivonmertts," pp. 502-508, 6$^{th}$ International Conference on Distributed Computing Systems, IEEE Computer Society, Cambridge, MA, May 1986.

Cheriton D.R., et al., "Uniform Access to Distributed Name Interpretation in the V-System," pp. 290-297, 4$^{th}$ International Conference on Distributed Computing System IEEE Computer Society, San Francisco, CA, May 1984.

Lampson, B.W., "Designing a Global Name Service,", pp. 1-10, Proceedings of the 5$^{th}$ Annual ACM Symposium on Principles of Distributed Computing ACM, Calgary, Alberta, Canada, Aug. 1986.

Curtis, R., et al., "Naming in Distributed Language Systems," pp. 298-302, 4$^{th}$ International Conference on Distributed Computing Systems. IEEE Computer Society, San Francsco, CA May 1984.

Squillante, M.C., et al., Integrating Heteregeneous Local Mail Systems, pp. 59-67, IEEE Software, Nov. 1989.

Schwartz, M.F., et al., Experience with a Semantically Cognizant Internet White Pages Directory Tool, Journal of Internetworking: Research and Experience, pp. 1-22 (1990).

Ordille, J.J., et al., "Nomenclater Descriptive Query Optimization for Large X.500 Environments," pp. 185-196, SIGCOM 91Conference, Communication Architectures & Protocols, vol. 21, No. 4. Zurich Switzerland, Sep. 1991.

Notkin, D., "Proxies: A Software Structure for Accomodating Hetergeneity," Software-Practice and Experience, vol. 20(4), 357-364, Apr. 1990.

Bjom N. Freeman-Benson, "Using the Web to Provide Private Information," First International Conference on the World Wide Web WWW 94, May 1994, 5 pages.

Chaum, D., Achieving Electronic Privacy, Scientific American, Aug. 1992, pp. 96-101.

Anderson, R., "Why Cryptosystems Fail," 1$^{st}$ Conf.-Computer & Comm. Security, 1993-11/93-VA, USA, pp. 215 227.

Abadi M., et al., "Authentication and Delegation with Smart-Cards," Oct. 1990, Chapter 67.

Rivest, R., "The MD5 Message-Digest Algorithm." MIT Laboratory for Computer Science and RSA Data Security, Inc., Apr. 1992.

Voydock V., et al.. "Security Mechanisms in High Level Network Protocols," Computing Surveys, vol. 15, No. 2, Jun. 1983 pp. 135-171.

Gligor, V.D., "Object Migration and Authentication," IEEE Transactions of Software Engineering, vol. SE-5, No. 6, Nov. 1979, pp. 607-611.

"Mosaic Communications Unveils Network Navigator and Server Software for the Internet," Mosaic Communications Press Release, Sep. 1994.

Rescorta, E., et al., "The Secure HyperTest Transfer Protocol," Aug. 1999.

Lou Montulli, Electronic Mail to Multiple Recipients of the www-talk list (www-talk.1995q2/0134.html on "Session Tracking" (omi.mail.www-talk, Apr. 18, 1995).

Ramanathan, Sirvivas, et al., "Architectures for Personalized Multimedia," IEEE Multimedia, vol. 1, No. 1, Computer Society, pp. 37-46, 1994.

Choudhury, Abhijit K., et al., "Copyright Protection for Electronic Publishing Over Computer Networks," IEEE Network, The Magazine of Computer Communications, vol. 9, No. 3, pp. 12-20, May 1995.

"Persistent Client State HTTP Cookies," http://search.netscape.com/newsref/std/cookie spec.html (Jan. 9, 1998).

"HTTP State Management Mechanism," http://www.internic.net/rfc/rfc2109.txt (Jan. 9, 1998)—http://www.cse.ohio-state.edu/cgi-bin/rfc/rfc2965.html.

Pitkow, J.E., and Recker, M.M., Using the Web as a Survey Tool: Results from Second WWW User Survey,: http://www.igd.fhg.de/archive/1995 www95/paoers/79/survey/survey_2_paper.html.

Peterson, Larry L, "A Yellow-Pages Service for a Local-Area Network," ACM Proceedings of the ACM SIGCOMM 87 Workshop, ACM Press, 1988, pp. 235-242.

Kahan, Jose, "Distributed Authorization Model for WWW," http://www.isoc.org/HMP/PAPER/107/html/paper.html. pp. 1-16, (1995).

Kahan, Jose, "Un nouveau modele d-autorisation pour les systemes de consultation d-information multimedia repartee," pp. 45-57, (1995).

Kahan, Jose, "A New Authorization Model for Distributed Multimedia Information Consultation Systems," English Translation, pp. 1-21, (1995).

Bemers-Lee, T., et al., http://www.ietf.org/rfc/rfc1738.txt?numbers=178, Dec. 1994.

Gary Welz, "The Media Business on the WWW", Proceedings of the Second World Wide Web Conference 1994: Mosaic and the Web, Oct. 1994, 6 pages.

Clickstream. Oct. 1996, The word Spy, [http:www.wordspy.com/words/clickstream.asp], 2 pages.

Bob Novick, (9503) Internet Marketing: The Clickstream, Mar. 1995, [http:/www.i-m.com/archives/9503/0375.html] 3 pages.

Brian W. Kemighan and Dennis M. Ritchie, "The C Programming Language" second edition, AT&T Bell Laboratories, (N.J., Prentice Hall) pp. 17-21 (1998).

Computer and Business Equipment Manufacturers Association, "American National Standard for Information Systems-Database Language SQL" (N.Y., American National Standards Institute) pp. 27-28 (1986).

Aho, A.V., et al., "Reports and Databases." In the AWK Programming Language, M.A. Harrison, ed., (Addison-Wesley), pp. 100-101 (1988).

(56) References Cited

OTHER PUBLICATIONS

Kelley, A., and Pohl, I., "Arrays, Strings, and Pointers." In a Book on C, A. Apt, ed., (the Benjamin/Cummings Publishing Company, Inc.,) pp. 35-37 (1984).
WordPerfect for Macintosh, pp. 153-162 (1990).
Complaint for Patent Infringement filed Jan. 12, 2004.
Amazon.com's Answer, Affirmative Defenses, and Counterclaims to Soverain Software's Complaint filed Mar. 9, 2004.
Amazon.com's Response to Plaintiffs First Set of Interrogatories filed Jun. 11, 2004.
Soverain's Responses and Objections to Amazon.com's First Set of Interrogatories (Nos. 1-14) filed Jun. 11, 2004.
Disclosure of Preliminary Invalidity Contentions by Defendants Amazon.com and the Gap (with Exhibit A) filed Jul. 6, 2004.
Amazon's Motion for Partial Summary Judgment of Non-Infringement ('780 Patent), and Memorandum in Support Thereof filed Jul. 15, 2005.
Soverain's Supplemental Responses to Amazon.com's First Set of Interrogatories (Nos. 1-14) filed Aug. 13, 2004.
Soverain's Second Supplemental Response to Amazon.com's First Set of Interrogatories (Nos. 1-14) filed Sep. 21, 2004.
Soverain's Opposition to Defendant Amazon.com's Motion for Partial Summary Judgement of Non-Infringement (780 Patent) and Supporting Memorandum; Declaration of Jack Grimes.
Amazon.com's Reply in Support of its Motion for Partial Summary Judgment of Non-Infringement (780 Patent) filed Aug. 19, 2004; Declaration of John Vandenberg.
Soverain's Surreply to Amazon.com's Motion for Partial Summary Judgment of Non-Infringement (780 Patent) filed Aug. 23, 2004 and Supplemental Declaration of Jack D. Grimes Ph.D. filed Aug. 23, 2004.
Soverain's Preliminary Claim Construction (Patent Local Rule 4-2) filed Sep. 2, 2004.
Joint Disclosure of Prelminary Claim Construction and Extrinsic Evidence by Defendants Amazon.com and the Gap (with Exhibits A-B) filed Sep. 2, 2004.
Joint Claim Construction and Prehearjng Statement•{Patent Local Rule43) (with.Exhibits A-D) filed Oct. 4, 2004.
Amazon.com's First Amended Answer, Affirmative Defenses, and Counterclaims to Soverain's Complaint filed Oct. 6, 2004.
Declaration of Jack D. Grimes Ph.D. dated Nov. 15, 2004.
Soverain's Claim Construction Brief Pursuant to Patent Rule 4-5(a) dated Nov. 16, 2004.
Declaration of Dr. Richard N. Taylor in Support of Defendant's Markman Brief dated Nov. 29, 2004.
Joint Claim Construction Brief of Amazon.com and Gap dated Nov. 30, 2004.
Soverain's Claim Construction Reply Brief Pursuant to Patent Rule 4-5(c) dated Dec. 7, 2004.
"A Sample Authorization Protocol for X", posted at /home/jg/Archive/ftp.x.org/pub/X11R4/miUiib/Xau/README, Dec. 8, 1988, 3 pages.
"Athena History (1983-Present) from A to Z," posted at http://web.mit.edu/acs/athena.html, Oct. 8, 2008, 12 pages.
"Business the Internet Way", The Age; Computers; Titles and Tops; Melbourne, Australia, Feb. 15, 1994, 3 pages.
"Digital Equipment Corporation Announces Version 2.0 of Its Electronic Store", Westlaw, News Release, Maynard, MA, Feb. 17, 1989, 3 pages.
"Files.Doc-List of Files and Their Meanings for Ktshopper 2.31", Files.doc, undated, 2 pages.
"First Virtual Corporate Brochure", Copyright 1995, First Virtual Holdings Incorporated, 28 pages.
"HTML + (Hypertext Markup Format)", HTML+ Discussion Document, Internet-Draft, Nov. 2, 1993, 65 pages.
"HTTP Request Fields", web page document, last modified May 3, 1994, 5 pages.
"HyperCard Reference Manual," Copyright 1993, Apple Computer, Inc., 449 pages.

"I Didn't Know I could do that on Compuserve!", CompuServe Incorporated, Copyright 1994, 135 pages.
"Peapod", Answers.com, Copyright 2008, 6 pages.
"Personal Finance: Quicken Adds Over 100 Improvements", Work-Group Computing Report, vol. 3, Sep. 14, 1992, 3 pages.
"PowerBASIC: Downloads", posted at http://www.powerbasic.com/files/pub/AIIFiles.asp, Jul. 26, 2000; May 23, 1994; Jul. 18, 1993; Mar. 26, 2001, Jul. 19, 1995; Mar. 3, 1993; Nov. 18, 1993; Nov. 12, 1995, Dec. 4, 1992, Apr. 14, 2003, 1 page.
"QSL-Quill Service Link: Your Electronic Connection to Superior Service and Best Values in Office Products", Quill Corporation, Copyright 1988, 34 pages.
"Quicken 6.0 Adds Electronic Credit Card Statements", by Bill Howard, PC Magazine, Nov. 10, 1992, 7 pages.
"Quicken for Windows 2.0", PC Computing Magazine, Jan. 1993, 3 pages.
"SCO Puts Business on the Internet; UNIX server leader announces SCO Global Access; The first "Internet Friendly" server for business", Business Wire, Santa Cruz, California, Mar. 7, 1994, 2 pages.
"Shopping—The Electronic Mall", CompuServe, Manual CS-597/Shopping, 1988, 3 pages.
"X.25", What is X.25?—A Word Definition From the Webopedia Computer Dictionary, retrieved from www.webopedia.com, May 1, 2001, 4 pages.
Allen, "Insecure WWW Access Authorization Protocol?", Mar. 8, 1994, 2 pages.
Andrews, et al., "Hyper-G: A Distributed Hypermedia System of the Second Generation", IICM, Graz University of Technology, Austria, 1995, 14 pages.
Andrews, K. et al., "Soaring through Hyperspace: A Snapshot of Hyper-G and its Harmony Client," Proc. Of Eurographics Symposium and Workshop on Multimedia; Multimedia/Hypermedia in Open Dstibuted Environments, Graz, Austria, Jun. 1994, 10 pages.
Atkins et al., "The Development of Packet Data Communications in the ISDN", British Telecom Research Laboratories, UK, Apr. 2, 1989, 5 pages.
Baron, C., "Dr. Dobb's Portal: Implementing a Web Shopping Cart", Sep. 1, 1996, 10 pages.
Bass, B., "AT&T Disconnects vintage Net Service", Federal Computer Week (FCW.com), Dec. 6, 1998, 2 pages.
Batini et al., "Conceptual Database Design: An Entity-Relationship Approach", The Benjamin/Cummings Publishing Company, Inc., Copyright 1992, 491 pages.
Bellare, et al., "Entity Authentication and Key Distribution", University of California, Aug. 1993, 29 pages.
Belsie, "Powerful Internet Should Skyrocket as Firms Go On-Line", The Christian Science Monitor, Mar. 16, 1994, 2 pages.
Berners-Lee et al., "Hypertext Markup Language: A Representation of Textual Information and Meta Information for Retrieval and Interchange", Jun. 1993, 40 pages.
Berners-Lee, "Information Management: A Proposal", The original proposal of the WWW, HTMLized, Mar. 1989, May 1990, 13 pages.
Berners-Lee, T. "Hypertext Tranfer Protocol: A Stateless Search, Retrieve and Manipulation Protocol", Internet Draft, draft-ietf-iiir-http-OO.txt, Nov. 5, 1993, 30 pages.
Bieber, M. et al., "Backtracking in a Multiple Window Hypertext Environment", ECHT '94 Proceedings of the 1994 ACM European conference on Hypertext technology, ACM, Sep. 1994, 15 pages.
Bowen, C. and Peyton, D., "How to Get the Most out of CompuServe," 3rd Edition, Bantam Books, New York, NY, United States, 1987, 432 pages.
Brown, Heather, "Hypermedia/Hypertext and Object-Oriented Databases", Published by Chapman & Hall, Copyright 1991, 329 pages.
Burchard, "Announcing W3Kit: A toolkit for Interactive Web Application Development", www-talk Jan.-Mar. 1994, Feb. 25, 1994, 1 page.
Burchard, "How W3Kit Works", Apr. 18, 1994, 3 pages.
Burchard, "Re: Server Control Over History", www-talk Jan.-Mar. 1994, Feb. 15, 1994, 2 pages.
Burchard, "W3Application", Apr. 18, 1994, 2 pages.
Burchard, "Re: Statelessness", www-talk Apr.-Jun. 1994, May 16, 1994, 1 page.

(56) References Cited

OTHER PUBLICATIONS

Business Wire, "CUC International Acquires Netmarket Company A Leader in Bringing Commerce to the Internet", Nov. 14, 1994, 6 pages.
Byrt, F., "Shopping at the High-Tech Mall", Business Section, New Hampshire Index, Jun. 19, 1994, 2 pages.
Carey, "Quicken 2.0 for Windows: Improving a Good Thing", Windows Sources, vol. 1, Feb. 1993, 3 pages.
Carnegie Mellon University Information Networking Institute, "Internet Billing Server Prototype Scope Document INI Technical Report 1993-1", Oct. 14, 1993, 29 pages.
Carr, L., et al., "The Microcosm Link Service and its Application to the World Wide Web", Dept. of Electronics and Computer Science, University of Southampton, England, 1994, 10 pages.
Cerf et al., "Specification of Internet Transmission Control Program", Network Working Group, Dec. 1974 Version, 66 pages.
Chang et al., "Architecture Alternative for Wireless Data Services: Interworking with Voiceband Modem", Bellcore, Red Bank, New Jersey, Copyright 1994, IEEE, 8 pages.
Cohen et al., "X.25 Implementation—The Untold Story", Bell Telephone Laboratories, New Jersey, Copyright 1983, 5 pages.
Conklin, "Hypertext: An Introduction and Survey", Microelectronics and Computer Technology Corp., Sep. 1987, 25 pages.
Cox, et al., "Netbill Security and Transaction Protocol", Carnegie Mellon University, Pittsburgh, Pennsylvania, 1995, 12 pages.
Crocker, et al., "CyberCash: Payments Systems for the Internet", Proc. INET'95, 2 pages.
Cronin, M.J., "Doing Business on the Internet: How the Electronic Highway is Transforming American Companies", Copyright 1994 by Van Nostrand Reinhold, 314 pages.
Davis, R., "Network Authentication Tokens", Ford Aerospace, Virginia, Copyright 1990 IEEE, 5 pages.
December, J., et al., "The World Wide Web Unleashed", Copyright 1994 by Sams Publishing, 5 pages.
Declaration dated Jun. 20, 2003, of Bjorn Freeman-Benson in Support of Defendants' Motion for Summary Judgment that the Patents in Suit are Invalid with Exhibits A-C, *Tumbleweed Communications v. Paypal, Inc., et al.* (N.D. Cal. 4:02-cv-02212), 33 pages.
Deloitte & Touche, "A Special Report on the Impact of Technology on Direct Marketing in the 1990s", Direct Marketing Association, Inc., Copyright 1990, 107 pages.
Detweiler, L., "IETF + PEM = Internet Commerce", Sep. 9, 1993, 2 pages.
Devetzis et al., "July IETF: Internet Mercantile Protocols BOF", Jul. 14, 1993, 3 pages.
Devetzis/Bellcore, "Minutes of the Internet Mercantile Protocols BOF (IMP)", Jul. 1993, 7 pages.
Doelz, R., et al., "The Use of WWW in Biological Research", May 24, 1994, 7 pages.
Ellis, C.S., "Infopreneurs Find Opportunity with On-Line Commercialization", Boulder County Business Report, Boulder, Colorado, vol. 12, Issue 12, Dec. 1993, 4 pages.
Ellsworth et al., "Using CompuServe—The Comprehensive Guide to all the Online Services and Resources Available!", Copyright 1994, Que Corporation, 470 pages.
Ellsworth, J. et al., "The Internet Business Book", John Wiley & Sons, Inc., Copyright 1994, 393 pages.
Estrin et al., "Visa Protocols for Controlling Inter-Organizational Datagram Flow: Extended Description", WRL Research Report 88/5, Western Research Laboratory, Palo Alto, California, Dec. 1988, 41 pages.
Fielding, R.T., "Maintaining Distributed Hypertest Infostructures: Welcome to MOMspider's Web", Department of Information and Computer Science, University of California, Irvine, Apr. 17, 1994, 10 pages.
Fleming et al., "Handbook of Relational Database Design", Copyright 1989 by Addison-Wesley Publishing Company, Inc., 610 pages.

Fodor, "Attitudes Anchor Harbor Sales: Inside Salespeople at Harbor Tool Supply Call on 252 Years of Collective Experience in Helping Process the Firm's Business", Industrial Distribution, Jun. 1, 1990, 6 pages.
Franklin Jr., "Selling Internet Access", VARBusiness, Copyright 1994, CMO Publications, Sep. 1, 1994, 6 pages.
Franks et al., "An Extension to HTTP: Digest Access Authentication", Network Working Group, RFC 2069, Jan. 1997, 18 pages.
Gettys, et al., "The X Window System, Version 11", Software-Practice and Experience, vol. 20, Oct. 1990, 67 pages.
Gluck, M., "HyperCard, HyperText, and HyperMedia for Librarys and Media Centers", Libraries Unlimited Inc, Englewood, Colorado, Copyright 1989, 294 pages.
Goodman, "Leveraging the Customer Databased to your Competitive Advantage. (Retail/Database)", Direct Marketing, Dec. 1, 1992, 4 pages.
Goodman, "The HyperCard Handbook 1.2 Upgrade Kit", Bantam Books, Oct. 1988, 185 pages.
Goodman, Danny, "The Complete HyperCard Handbook-Second Edition", Bantam Books, Oct. 1988, 669 pages.
Google Groups, "Authentication on the Web?", comp.infosystems.www, Jul. 1994, 2 pages.
Google Groups, "Client-Server Database Query", comp.databases, May 1994, 2 pages.
Google Groups, "Condom Country", 1994, 5 pages.
Google Groups, "Cyberspace Development: Builders of Internet Storefronts", alt.internet.services, Nov. 1993, 2 pages.
Google Groups, "Decnews for UNIX, Issue #16", biz.dec, Feb. 16, 1994, 4 pages.
Google Groups, "Dec's DIGITAL STORE Now on the INTERNET", bit.listserv.dectei-l, Jan. 1994, 13 pages.
Google Groups, "Gopher Conference 93 (Yet another report)", Bionet.general, May 1993, 8 pages.
Google Groups, "How to Get Statefull HTML Documents", Comp.infosystems.www.misc, Jun. 1994, 2 pages.
Google Groups, "How to Maintain State: ANSWERS", Sep. 1994, comp.infosystems.www.providers, 1 page.
Google Groups, "How to Maintain STATE?", comp.infosystems.www.providers, Aug.-Sep. 1994, 4 pages.
Google Groups, "How to Share Data Among CGI Scripts", comp.infosystems.www, May-Jun. 1994, 4 pages.
Google Groups, "How we do personalized gopher and Web authentication", Comp.sys.hp.mpe, Jan. 1995, 2 pages.
Google Groups, "hp3k & gopher & Web update transaction article", Comp.sys.hp.mpe, Jan. 1995, 3 pages.
Google Groups, "HTTP Servers with State?", Comp.infosystems.www, Jan. 1994, 2 pages.
Google Groups, "Invisible 'name=value' pairs in FORMS???", comp.infosystems.www, Mar. 1994, 2 pages.
Google Groups, "Looking for an 'order Entry' Program", comp.bbs.tbbs, Aug. 25, 1994, 1 page.
Google Groups, "Mac Database Summary", Comp.sys.mac.databases, Sep. 1992, 14 pages.
Google Groups, "Product Release", comp.bbs.tbbs, Aug. 6, 1994, 6 pages.
Google Groups, "Query Image From Netscape-HTTP Tutorial Enclosed", comp.sys.hp.mpe, Mar. 1995, 6 pages.
Google Groups, "Stateful connections via WWW", comp.infosystems.www, Dec. 1993, 1 page.
Google Groups, "stateful HTTP?", comp.infosystems.www, Feb. 1994, 5 pages.
Google Groups, "'Stateful' server via special URL's?", comp.infosystems.www, Jul. 1993, 4 pages.
Google Groups, "Transactional Services on WWW", Comp.Infosystems.www, May 12, 1994, 5 pages.
Google Groups, "Using FORMS", comp.infosystems.www, Dec. 1993, 2 pages.
Google Groups, "Using Hypercard on a Network", Comp.sys.mac.hypercard. Jan.-Feb. 1994, 3 pages.
Google Groups, "WWW FAQ v.0.1 (fwd)", Comp.infosystems.www, May 1993, 5 pages.
Google Groups, "WWW games?", comp.infosystems.www, Feb.-Mar. 1994, 15 pages.

(56) References Cited

OTHER PUBLICATIONS

Google Groups, "Not Dropping the Connection Was: Re: WWW games?", cern.www.talk, Mar. 1994, 4 pages.
Gray et al., "Transaction Processing: Concepts and Techniques", Morgan Kaufmann Publishers, San Francisco, California, 1993, 144 pages.
Hickey, "Shopping at Home: One Modem Line, No Waiting", Home PC, 1994, 3 pages.
Higgens, Steve, "For Advertisers, Tapping Into On-Line Services is Harder Than it Looks", Published in Investor's Business Daily, Apr. 7, 1994, 3 pages.
Hostetler et al., "A Proposed Extension to HTTP: Digest Access Authentication", [Proposed] HTTP Working Group, Internet Draft, Mar. 10, 1995, 6 pages.
Huang et al., "Evolution and Integration of a Multi-Media Communications Network", Siemens Public Switching Systems, Inc., Boca Raton, Florida, 1989 IEEE, 5 pages.
Hughes, Kevin, "Entering the World-Wide Web: A Guide to Cyberspace", ACM Siglink Newsletter, vol. III No. 1, Mar. 1994, 5 pages.
Hughes, Kevin, "Entering the World-Wide Web: A Guide to Cyberspace", Honolulu Community College, Oct. 1993, 18 pages.
HyperActive Software, "Cool Things our Readers do with HyperCard", retrieved from http://www.hyperactivesw.com/HCStories/stories3.html on Sep. 19, 2008, 23 pages.
Ibrahim, "World-Wide Algorithm Animation", Computer Science Department, University of Geneva, Switzerland, 1994, 12 pages.
International Search Report for International Patent Application No. PCT/US1996/07838, issued Jan. 27, 1997, 5 pages.
Kane, "The Hitchkiker's Guide to the Electronic Highway", MSI Press, Inc., Copyright 1994, 403 pages.
Kappe, F. et al., "Hyper-G: A New Tool for Distributed Hypermedia", IIG Technical Report No. 388, IIG, Graz University of Technology, Austria, May 1993, 14 pages.
Kappe, F., "Hyper-G: A Distributed Hypermedia System" in Leiner B. (editor): Proc. INET '93, San Francisco, California, pp. DCC-1-DCC-9, Internet Society, Aug. 1993, 10 pages.
Kelsey Technologies and Mark P. Cirmotich, "KTShopper—the Online Shopping Center" Version 2.31, Kelsey Technologies, Sep. 23, 1992, 22 pages.
Kohl, J. et al., "The Kerberos Network Authentication Service (V5)", Request for Comments: 1510, Network Working Group, Sep. 1993, 105 pages.
Koster, "ALIweb—Archie-Like Indexing in the WEB", Version 0.1, Mar. 16, 1994, 10 pages.
Kuzela, "'Shop' by Television; Redcoats join communications fight" Business Trends, Feb. 22, 1982, 2 pages.
Lavenant et al., "The Phoenix Project: Distributed Hypermedia Authoring", Biological Sciences Division Academic Computing, Chicago, Illinois, 1994, 6 pages.
Levergood et al., "AudioFile: A Network-Transparent System for Distributed Audio Applications", Digital Equipment Corporation, Cambridge Research Lab, Jun. 11, 1993, 110 pgs.
Lewis, "Company News: Food from Cyberspace; For Ameritech, On-Line Food Shopping", The New York Times, Sep. 16, 1994, 1 page.
Lewis, "Getting Down to Business on the Net", The New York Times, Jun. 19, 1994, 1 page.
Lewis, "On-Line Middleman Opens for Business", The New York Times, Oct. 2, 1995, 3 pages.
Lewis, "The Executive Computer; A Growing Internet is Trying to Take Care of Business", The New York Times, Section 3, p. 7, col. 1: Financial Desk, Dec. 12, 1993, 32 pages.
Little, "Multimedia at Work: Commerce on the Internet", IEEE MultiMedia, Winter 1994, 5 pages.
Litwin et al., "Multidatabase Interoperability", Institut National de Récherche en Informatique et an Automatique, Dec. 1986, 9 pages.
Looney, "iT Works: the Simple Business System", Operating Manual for Version 7, Copyright 1994 by Paul Looney, 117 pages.
Mann, "How to Choose and Use Personal-Finance Software", Compute! Issue 151, Apr. 1993, 5 pages.
Mansfield, "The Joy of X: An Overview of the X Window System", Addison-Wesley Publishing Company, Copyright 1993, 378 pages.
Mathison, "Commercial, Legal, and International Aspects of Packet Communications", Proceedings of the IEEE, vol. 66, No. 11, Nov. 1978, 13 pages.
Mathog, "GCG on DEC AXP Info", e-mail posted at http://www.bio.net/bionet/hypermail/info-gcg/1994-May/000581.html, May 16, 1994, 3 pages.
McAleese et al., "Hypertext: State of the Art", Copyright 1990, Intellect Ltd., 281 Pages.
McBryan, "GENVL and WWWW: Tools for Taming the Web", University of Colorado, Department of Computer Science, May 1994, 12 pages.
McCool, "using PGP/PEM? using Kerberos?", www-Talk Jan.-Mar. 1994: using PGP/PEM? using Kerberos?, Feb. 25, 1995, 1 page.
McKee, D., "Towards Better Integration of Dynamic Search Technology and the World-Wide Web", NaviSoft, Inc., California, USA, 1994, 7 pages.
Meschkat, "Active Articles in Interactive Journals", Apr. 15, 1994, 5 pages.
Miller, et al., "Kerberos—Introduction to the Kerberos System", Manpagez: man pages & More: man kerberos(1), Copyright 1985, 1986, 1989-1996, 2002, Massachusetts Institute of Technology, 2 pages.
Miller, et al., "Kerberos Man Page", MIT Project Athena, Kerberos Version 4.0, Copyright 1985, 1986, Massachusetts Institute of Technology, 4 pages.
Morgan, "Implementing TCP/IP Communications with HyperCard", Information Technology and Libraries, Dec. 1992, 12 pages.
Natale, "Windows SNMP, An Open Interface for Programming Network Management Applications Using the Simple Network Management Protocol Under Microsoft Windows", Version 1.0, American Computer & Electronics Corporation, Gaithersburg, Maryland, Sep. 13, 1993, 103 pages.
NCSA HTTPd, "Mosaic User Authentication Tutorial", printed Dec. 5, 1995, 7 pages.
Nelson, T., "Session 4: Complexing Information Processing", ACM 20th National Conference, Aug. 24, 1965, 17 pages.
Neuss, Christian et al., "Lost in Hyperspace? Free Text Searches in the Web", Fraunhofer Institute for Computer Graphics, Germany, May 1994, 8 pages.
Neuss, "Re: Passing info between pages", WWW-Talk, e-mail posted at http://1997.webhistory.org/www.lists/www-talk.1994q1/0106.html, Jan. 10, 1994, 2 pages.
Nickerson, WorldWideWeb: hypertext from CERN. (European Particle Physics Laboratory), Computers in Libraries, Dec. 1, 1992, 2 pages.
Non-Final Office Action dated Mar. 1, 2012, for Reexamination Control No. 90/011,937, filed Sep. 30, 2011, in Reexamination of U.S. Patent No. 7,272,639, issued Sep. 18, 2007, 7 pages.
Non-Final Office Action dated Mar. 17, 2005, for Reexamination Control No. 90/007,183, filed Aug. 24, 2004, in Reexamination of U.S. Patent No. 5,708,780, issued Jan. 13, 1998, 35 pages.
Notice of Intent to Issue a Reexamination Certificate, dated Jul. 14, 2011, for Reexamination Control No. 90/011,444 in Reexamination of U.S. Patent No. 7,272,639, issued Sep. 18, 2007, 13 pages.
Notice of Intent to Issue a Reexamination Certificate, dated Jul. 27, 2005, for Reexamination Control No. 90/007,183, filed Aug. 24, 2004, in Reexamination of U.S. Patent No. 5,708,780, issued Jan. 13, 1998, 6 pages.
O'Reilly, R., "2 Programs That Make Personal Finance Easier", Computer File, Los Angeles Times, California, Oct. 1, 1992, 3 pages.
Packard, K., "X Display Manager Control Protocol, MIT X Consortium Standard", Version 1.0, Laboratory for Computer Science, Massachusetts Institute of Technology, 1989, 19 pages.
Patent Owner's Reply dated May 1, 2012, to First Under Office Action 37 C.F.R. § 1.111 and 1.550 in Ex Parte Reexamination with Exhibits, for Reexamination Control No. 90/011,937, filed Sep. 30, 2011, in Reexamination of U.S. Patent No. 7,272,639, issued Sep. 18, 2007, 152 pages.

(56) References Cited

OTHER PUBLICATIONS

Patent Owner's Statement dated Apr. 25, 2011, from Soverain Software LLC in response to the Order Granting Request for Ex Parte Reexamination of U.S. Patent No. 7,272,639, issued Sep. 18, 2007, 54 pages.
Patent Owner's Statement dated May 2, 2011, from Soverain Software LLC in response to the Order Granting Request for Ex Parte Reexamination of U.S. Patent No. 5,715,314, issued Feb. 3, 1998, 129 pages.
Patent Owner's Statement dated May 2, 2011, from Soverain Software LLC in response to the Order Granting Request for Ex Parte Reexamination of U.S. Patent No. 5,909,492, issued Jun. 1, 1999, 135 pages.
Payne, "AF2R2 Announcement—AudioFile Version 2, Release 2, README", Feb. 16, 1993, 280 pages.
Payne, "FastCGI: A High-Performance Web Server Interface", Open Market, Inc., Apr. 1996, 7 pages.
PC Week, "Hypertext Software Helps Users Weave Complex Data Webs", Mar. 1, 1988, 3 pages.
Perrochon, L., "Translation Servers: Gateways Between Stateless and Stateful Information Systems", Institut für Informationssysteme, Zürich, Switzerland, 1994, 12 pages.
Phillips, "SuperHighway Access Eases Internet Entry", Netweek: A Section for Implementers of Enterprise-Wide Systems, PC Week, Oct. 31, 1994, 3 pages.
Photographs of the JBA System Development, 1992, 6 pages.
Pitkow et al., "Integrating Bottom-Up and Top-Down Analysis For Intelligent Hypertext", Intelligent Hypertext Workshop, 3rd International Conference on Information and Knowledge Management, Dec. 1994, 4 pages.
Plugge, et al., "American Airlines' 'Sabre' Electronic Reservations System", May 11, 1961, 13 pages.
Preset, "Graduates Capitalize on Internet", The Phoenix, Swarthmore College, Swarthmore, Pennsylvania, Apr. 19, 1994, 2 pages.
Quatromoni, "Digital Announces New Commercial Internet Capabilities at Internet World '94", Digital Equipment Corporation, San Jose, California, Posted at http://www.panix.com/-clocke/mecklerweb/dec-internet.html, Jun. 1, 1994, 2 pages.
Raggett, "Mediated Digest Authentication", Internet Draft Memorandum, Mar. 27, 1995, 9 pages.
Raggett, "Re: Comments on html+discussion document (dated Nov. 2, 1993)", WWW-Talk Jan.-Mar. 1994, posted at http://1997.webhistory.org/www.lists/www-talk.1994q1/0069.html, Jan. 7, 1994, 14 pages.
Raggett, "Re: Link Info Outside Doc", WWW-Talk Jul.-Sep. 1993, posted at http://1997.webhistory.org/www.lists/www-talk.1993q3/0012.html, Jul. 1, 1993, 1 page.
Rathore, R., et al., "Service Provisioning Operations for Public Packet Switched Network (PPSN) Access", IEEE Communications Magazine, Oct. 1987-vol. 25, No. 10, 6 pages.
Reid, "Architects of the Web: 1,000 Days that Built the Future of Business", Published by John Wiley & Sons, Inc., Copyright 1997, 421 pages.
Request dated Aug. 24, 2004, for ex parte reexamination of U.S. Patent No. 5,708,780 issued Jan. 13, 1998, 73 pages.
Request dated Jan. 18, 2011, for ex parte reexamination of U.S. Patent No. 5,715,314 issued Jan. 26, 1998, 74 pages.
Request dated Jan. 18, 2011, for ex parte reexamination of U.S. Patent No. 5,909,492 issued May 21, 1999, 195 pages.
Request dated Jan. 18, 2011, for ex parte reexamination of U.S. Patent No. 7,272,639, issued Sep. 18, 2007, 82 pages.
Request dated Sep. 30, 2011, for Ex Parte Reexamination of Control No. 90/011,937, in Reexamination of U.S. Patent No. 7,272,639, issued Sep. 18, 2007, 81 pages.
Roban et al., "Discovering WESTLAW: The Essential Guide—3rd Edition", Copyright 1993, West Publishing Company, 317 pages.
Rodgers et al., "On-Line Images from the History of Medicine (OLI): Creating a Large Searchable Image Database for Distribution via World-Wide Web", Proceedings of the First International World-Wide Web Conference. Geneva, May 25-27, 1994, 9 pages.
Rosen, "Strategies; For the Do-it-Yourself Financial Planner, Software to the Rescue", The New York Times, Jan. 2, 1993, 2 pages.
Rosenthal, "EINet: A Secure, Open Network for Electronic Commerce", MCC EINet, 1994 IEEE, pp. 219-226.
Rybczynski, Anthony, "X.25 Interface and End-to-End Virtual Circuit Service Characteristics", IEEE transactions on Communications, vol. Com-28, No. 4, Apr. 4, 1980, 11 pages.
Scheifler et al., "The X Window System", Software-Practice and Experience, vol. 20, Oct. 1990, 30 pages.
Schlender, "New Software Beginning to Unlock the Power of Person Computers", Wall Street Journal, Nov. 16, 1987, 1 page.
Schubert, Eric, "Personal Data Access on the Campus Network", University of Notre Dame, Indiana, Nov. 8, 1993, Schwartz, 5 pages.
Schwartz, "Giving Web a Memory Costs Its Users Privacy", The New York Times, Sep. 4, 2001, 5 pages.
Seltzer, "The Internet—A New Dimension", Glimpse of the Future, retrieved from http://samizdat.com/gli8mpse.html, 1994, 4 pages.
Shafer, "Using Oracle with HyperCard", Hayden Books, Carmel, Indiana, Copyright 1990, 433 pages.
Sheeler, "Virtual Malls Allow Shoppers to Browse in Digital Marketplace", Extract from Boulder Daily Camera, Mar. 22, 1994, 2 pages.
Sheridan, J., "Marketing by Modem; Computer System Will Link Firm with 100,000 Customers by Yearend", Industry Week, Jun. 6, 1988, 2 pages.
Shneiderman et al., "Hypertext Hands-On! An Introduction to a New Way of Organizing and Accessing Information", Copyright 1989 by Addison-Wesley Publishing Company, Inc., 186 pages.
Siegmann, Ken, "ComputerLand Declares Ware on JWP Businessland", The San Francisco Chronicle, The Chronicle Publishing Company, Dec. 12, 1991, 2 pages.
Sinha et al., "An Introduction to Network Programming Using the NetBios Interface", MSJNETB.TXT, Mar.-Apr. 1992, 17 pages.
Sirbu et al., "NetBill: An Internet Commerce System Optimized for Network-Delivered Services", IEEE Personal Communications, vol. 2, No. 4, Aug. 1995, 6 pages.
Smith, The New Frontier (Data Base Marketing) (Part 2 in a Series), Direct Marketing, Jun. 1, 1991, 6 pages.
Smith, "The New Frontier (Use of New Technologies in Marketing) (Includes Related Articles) (Part 5)", Direct Marketing, Sep. 1, 1991, 6 pages.
St. Johns, M., "Authentication Server", Network Working Group, TPSC, Request for Comments 912, Jan. 1985, 5 pages.
St. Johns, M., "Identification Protocol", Network Working Group, US Department of Defense, Feb. 1993, 7 pages.
Steiner et al., "Kerberos: An Authentication Service for Open Network Systems", Project Athena, Massachusetts Institute of Technology, Mar. 30, 1988, 15 pages.
Stewart, et al., "101 Database Exercises", Glencoe McGraw-Hill, Copyright 1992, 153 pages.
Sullivan, E., "HTTP Eases Access to Internet Info", PC Week, Jan. 31, 1994, 2 pages.
Sun Microsystems, Inc., "NFS: Network File System Protocol Specification", March 1989, 27 pages.
Taylor, D., "The Internet Mall: Shopping on the Information Highway," biz.comp.services, Sep. 15, 1995, 35 pages.
Thompson, T., "CBIS NetBios Programmer's Reference," Norcross, GA: CBIS, Inc., United States, Apr. 1988, 27 pages.
Treese, G. Winfield et al., "X Through the Firewall and Other Application Relays", Digital Equipment Corporation, Cambridge Research Laboratory, May 3, 1993, 23 pages.
Treese, G. Winfield, "Bix.dec Frequently Asked Questions", e-mail posting, Mar. 5, 1994, 8 pages.
Tsudik et al., "On Simple and Secure Key Distribution", Communications and Computer Science Department, IBM Zurich Research Laboratory, Switzerland, Nov. 1993, 8 pages.
Turner, "A National Campaign: Atlanta's Summer Tourism Budget hits $2 million with Help from Visa", The Atlanta Constitution, May 7, 1993, 2 pages.

(56) References Cited

OTHER PUBLICATIONS

Tygar, J.D., "Atomicity in Electronic Commerce", Carnegie Mellon University, Pittsburgh, Pennsylvania, School of Computer Science, Jan. 1996, 22 pages.
USPTO Order dated Dec. 6, 2011, granting request for Ex Parte Reexamination Control No. 90/011,937, in Reexamination of U.S. Patent No. 7,272,639, issued Sep. 18, 2007, 22 pages.
USPTO Order dated Feb. 25, 2011, granting request for ex parte reexamination of U.S. Patent No. 7,272,639, issued Sep. 18, 2007, 14 pages.
USPTO Order dated Mar. 2, 2011, granting request for ex parte reexamination of U.S. Patent No. 5,715,314, issued Feb. 3, 1998, 18 pages.
USPTO Order dated Mar. 2, 2011, granting request for U.S. Patent No. 5,909,492, issued Jun. 1, 1999, 27 pages.
USPTO Order dated Oct. 21, 2004, granting request for U.S. Patent No. 5,708,780, issued Jan. 13, 1998, 5 pages.
Varela et al., "Zelig: Schema-Based Generation of Soft WWW Database Applications", University of Illinois at Urbana—Champaign, Department of Computer Science, 1994, 8 pages.
Weibel, et al., "An Architecture for Scholarly Published on the World Wide Web", Office of Research, OCLC Online Computer Library Center, Dec. 1995, 8 pages.
Weibel, et al., various e-mail communications entitled "the I-D Directories?", Aug. 22-Aug. 24, 1994, 3 pages.
Wells, David, "High Speed X.25 and Frame Relay—a comparison", Apr. 22, 1992, 5 pages.
Wesley-Tanaskovic et al., "Expanding Access to Science and Technology: The Role of Information Technologies", Proceedings of the Second International Symposium on the Frontiers of Science and Technology Held in Kyoto, Japan, May 12-14, 1992, 7 pages.
Wheaton, How to Create a Customer Database. (Lists and Databases), Direct Marketing, Feb. 1, 1990, 8 pages.
Wikipedia Page, "CUC International", Page last modified on May 22, 2008, 3 pages.
Wiseman, P., "The Internet Snares More Businesses", USA Today.com, McLean, Virginia, Jul. 7, 1994, 4 pages.
WWW94-Preliminary Proceedings, "List of PostScript Files for the WWW9A, Advance Proceedings", Jun. 2, 1994, 7 pages.
WWWorder e-mail posting seeking Beta (Final Release) Testers for Internet ShopKeeper, Jul. 25, 1994, 1 page.
Zodrow, "Bear Creek Builds In-House Gold Mine. (Mail Order marketer Bear Creek Corp.)(Database)", Direct Marketing, Jan. 1, 1993, 8 pages.
Levergood et al., "AudioFile: A Network-Transparent System for Distributed Audio Applications", Digital Equipment Corporation, Cambridge Research Lab, originally published in the Proceedings of USENIX Summer 1993 Technical Conference, Cincinnati, Ohio, Jun. 21-25, 1993, 28 pages.
Co-pending U.S. Appl. No. 09/548,235 Levergood, et al., filed on Apr. 12, 2000 (Not Published).

* cited by examiner

| Document View | |
|---|---|
| *File*   *Options*   *Navigate*   *Annotate*   *Documents* | *Help* |

Title: How to join

URL: http://auth.com/service/nph-createacct.cgi

1. First name ⬜

2. Last name ⬜

3. Choose a screen name (no more than 15 characters)
⬜

4. Choose a password (no more than 15 characters)

Password:
⬜

Re-enter password:
⬜

5. E-mail address
⬜

6. Your birthdate (MM/DD/YY) ⬜

7. U.S. zip code, or country code

Zip/postal code:
⬜

ISO country code
    US

FIG. 5

METHOD AND SYSTEM FOR COUNTING WEB ACCESS REQUESTS

RELATED APPLICATION

This application is a Divisional of U.S. of application Ser. No. 09/005,479 filed Jan. 12, 1998, now U.S. Pat. No. 7,272,639 which is a Continuation of U.S. application Ser. No. 08/474,096, filed Jun. 7, 1995, now U.S. Pat. No. 5,708,780 the entire teachings of which are incorporated herein by reference.

BACKGROUND TO THE INVENTION

The Internet, which started in the late 1960s, is a vast computer network consisting of many smaller networks that span the entire globe. The Internet has grown exponentially, and millions of users ranging from individuals to corporations now use permanent and dial-up connections to use the Internet on a daily basis worldwide. The computers or networks of computers connected within the Internet, known as "hosts", allow public access to databases featuring information in nearly every field of expertise and are supported by entities ranging from universities and government to many commercial organizations.

The information on the Internet is made available to the public through "servers". A server is a system running on an Internet host for making available files or documents contained within that host. Such files are typically stored on magnetic storage devices, such as tape drives or fixed disks, local to the host. An Internet server may distribute information to any computer that requests the files on a host. The computer making such a request is known as the "client", which may be an Internet-connected workstation, bulletin board system or home personal computer (PC).

TCP/IP (Transmission Control Protocol/Internet Protocol) is one networking protocol that permits full use of the Internet. All computers on a TCP/IP network need unique ID codes. Therefore, each computer or host on the Internet is identified by a unique number code, known as the IP (Internet Protocol) number or address, and corresponding network and computer names. In the past, an Internet user gained access to its resources only by identifying the host computer and a path through directories within the host's storage to locate a requested file. Although various navigating tools have helped users to search resources on the Internet without knowing specific host addresses, these tools still require a substantial technical knowledge of the Internet.

The World-Wide Web (Web) is a method of accessing information on the Internet which allows a user to navigate the Internet resources intuitively, without IP addresses or other technical knowledge. The Web dispenses with command-line utilities which typically require a user to transmit sets of commands to communicate with an Internet server. Instead, the Web is made up of hundreds of thousands of interconnected "pages", or documents, which can be displayed on a computer monitor. The Web pages are provided by hosts running special servers. Software which runs these Web servers is relatively simple and is available on a wide range of computer platforms including PC's. Equally available is a form of client software, known as a Web "browser", which is used to display Web pages as well as traditional non-Web files on the client system. Today, the Internet hosts which provide Web servers are increasing at a rate of more than 300 per month, en route to becoming the preferred method of Internet communication.

Created in 1991, the Web is based on the concept of "hypertext" and a transfer method known as "HTTP" (Hypertext Transfer Protocol). HTTP is designed to run primarily over TCP/IP and uses the standard Internet setup, where a server issues the data and a client displays or processes it. One format for information transfer is to create documents using Hypertext Markup Language (HTML). HTML pages are made up of standard text as well as formatting codes which indicate how the page should be displayed. The Web client, a browser, reads these codes in order to display the page. The hypertext conventions and related functions of the world wide web are described in the appendices of U.S. patent application Ser. No. 08/328,133, filed on Oct. 24, 1994, by Payne et al. which is incorporated herein by reference.

Each Web page may contain pictures and sounds in addition to text. Hidden behind certain text, pictures or sounds are connections, known as "hypertext links" ("links"), to other pages within the same server or even on other computers within the Internet. For example, links may be visually displayed as words or phrases that may be underlined or displayed in a second color. Each link is directed to a web page by using a special name called a URL (Uniform Resource Locator). URLs enable a Web browser to go directly to any file held on any Web server. A user may also specify a known URL by writing it directly into the command line on a Web page to jump to another Web page.

The URL naming system consists of three parts: the transfer format, the host name of the machine that holds the file, and the path to the file. An example of a URL may be:

http://www.college.univ.edu/Adir/Bdir/Cdir/page.html, where "http" represents the transfer protocol; a colon and two forward slashes (://) are used to separate the transfer format from the host name; "www.college.univ.edu" is the host name in which "www" denotes that the file being requested is a Web page; "/Adir/Bdir/Cdir" is a set of directory names in a tree structure, or a path, on the host machine; and "page.html" is the file name with an indication that the file is written in HTML.

The Internet maintains an open structure in which exchanges of information are made cost-free without restriction. The free access format inherent to the Internet, however, presents difficulties for those information providers requiring control over their Internet servers. Consider for example, a research organization that may want to make certain technical information available on its Internet server to a large group of colleagues around the globe, but the information must be kept confidential. Without means for identifying each client, the organization would not be able to provide information on the network on a confidential or preferential basis. In another situation, a company may want to provide highly specific service tips over its Internet server only to customers having service contracts or accounts.

Access control by an Internet server is difficult for at least two reasons. First, when a client sends a request for a file on a remote Internet server, that message is routed or relayed by a web of computers connected through the Internet until it reaches its destination host. The client does not necessarily know how its message reaches the server. At the same time, the server makes responses without ever knowing exactly who the client is or what its IP address is. While the server may be programmed to trace its clients, the task of tracing is often difficult, if not impossible. Secondly, to prevent unwanted intrusion into private local area networks (LAN), system administrators implement various data-flow control mechanisms, such as the Internet "firewalls", within their networks. An Internet firewall allows a user to reach the Internet anonymously while preventing intruders of the outside world from accessing the user's LAN.

SUMMARY OF THE INVENTION

The present invention relates to methods of processing service requests from a client to a server through a network. In particular the present invention is applicable to processing client requests in an HTTP (Hypertext Transfer Protocol) environment, such as the World-Wide Web (Web). One aspect of the invention involves forwarding a service request from the client to the server and appending a session identification (SID) to the request and to subsequent service requests from the client to the server within a session of requests. In a preferred embodiment, the present method involves returning the SID from the server to the client upon an initial service request made by the client. A valid SID may include an authorization identifier to allow a user to access controlled files.

In a preferred embodiment, a client request is made with a Uniform Resource Locator (URL) from a Web browser. Where a client request is directed to a controlled file without an SID, the Internet server subjects the client to an authorization routine prior to issuing the SID, the SID being protected from forgery. A content server initiates the authorization routine by redirecting the client's request to an authentication server which may be at a different host. Upon receiving a redirected request, the authentication server returns a response to interrogate the client and then issues an SID to a qualified client. For a new client, the authentication server may open a new account and issue an SID thereafter. A valid SID typically comprises a user identifier, an accessible domain, a key identifier, an expiration time such as date, the IP address of the user computer, and an unforgeable digital signature such as a cryptographic hash of all of the other items in the SID encrypted with a secret key. The authentication server then forwards a new request consisting of the original URL appended by the SID to the client in a REDIRECT. The modified request formed by a new URL is automatically forwarded by the client browser to the content server.

When the content server receives a URL request accompanied by an SID, it logs the URL with the SID and the user IP address in a transaction log and proceeds to validate the SID. When the SID is so validated, the content server sends the requested document for display by the client's Web browser.

In the preferred embodiment, a valid SID allows the client to access all controlled files within a protection domain without requiring further authorization. A protection domain is defined by the service provider and is a collection of controlled files of common protection within one or more servers.

When a client accesses a controlled Web page with a valid SID, the user viewing the page may want to traverse a link to view another Web page. There are several possibilities. The user may traverse a link to another page in the same path. This is called a "relative link". A relative link may be made either within the same domain or to a different domain. The browser on the client computer executes a relative link by rewriting the current URL to replace the old controlled page name with a new one. The new URL retains all portions of the old, including the SID, except for the new page name. If the relative link points to a page in the same protection domain, the SID remains valid, and the request is honored. However, if the relative link points to a controlled page in a different protection domain, the SID is no longer valid, and the client is automatically redirected to forward the rewritten URL to the authentication server to update the SID. The updated or new SID provides access to the new domain if the user is qualified.

The user may also elect to traverse a link to a document in a different path. This is called an "absolute link". In generating a new absolute link, the SID is overwritten by the browser. In the preferred embodiment, the content server, in each serving of a controlled Web page within the domain, filters the page to include the current SID in each absolute URL on the page. Hence, when the user elects to traverse an absolute link, the browser is facilitated with an authenticated URL which is directed with its SID to a page in a different path. In another embodiment, the content server may forego the filtering procedure as above-described and redirect an absolute URL to the authentication server for an update.

An absolute link may also be directed to a controlled file in a different domain. Again, such a request is redirected to the authentication server for processing of a new SID. An absolute link directed to an uncontrolled file is accorded an immediate access.

In another embodiment, a server access control may be maintained by programming the client browser to store an SID or a similar tag for use in each URL call to that particular server. This embodiment, however, requires a special browser which can handle such communications and was generally not suitable for early browser formats common to the Web. However, it may now be implemented in cookie compatible browsers.

Another aspect of the invention is to monitor the frequency and duration of access to various pages both controlled and uncontrolled. A transaction log within a content server keeps a history of each client access to a page including the link sequence through which the page was accessed. Additionally, the content server may count the client requests exclusive of repeated requests from a common client. Such records provide important marketing feedback including user demand, access pattern, and relationships between customer demographics and accessed pages and access patterns.

The above and other features of the invention including various novel details of construction and combinations of parts will now be more particularly described with reference to the accompanying drawings and pointed out in the claims. It will be understood that the particular devices and methods embodying the invention are shown by way of illustration only and not as limitations of the invention. The principles and features of this invention may be employed in varied and numerous embodiments without departing from the scope of the invention.

BRIEF DESCRIPTION OF THE DRAWINGS

FIG. 5 is an example of an authorization form page.

DETAILED DESCRIPTION OF THE INVENTION

Figure 1:
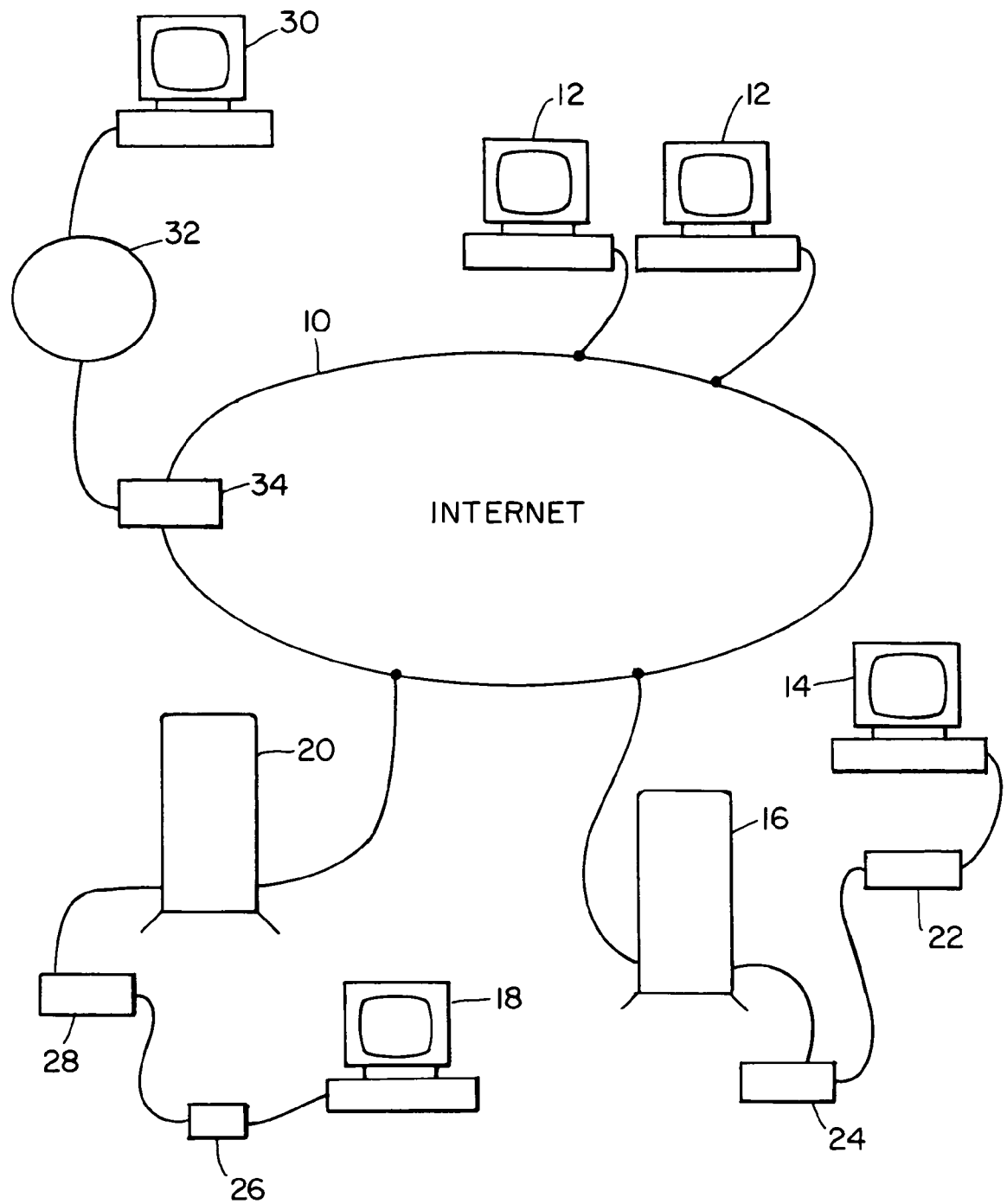
FIG. 1 is a diagram illustrating the Internet operation.

Referring now to the drawings, FIG. 1 is a graphical illustration of the Internet. The Internet 10 is a network of millions of interconnected computers 12 including systems owned by Internet providers 16 and information systems (BBS) 20 such as Compuserve or America Online. Individual or corporate users may establish connections to the Internet in several ways. A user on a home PC 14 may purchase an account through the Internet provider 16. Using a modem 22, the PC user can dial up the Internet provider to connect to a high speed modem 24 which, in turn, provides a full service connection to the Internet. A user 18 may also make a somewhat limited connection to the Internet through a BBS 20 that provides an Internet gateway connection to its customers.

Figure 2A:
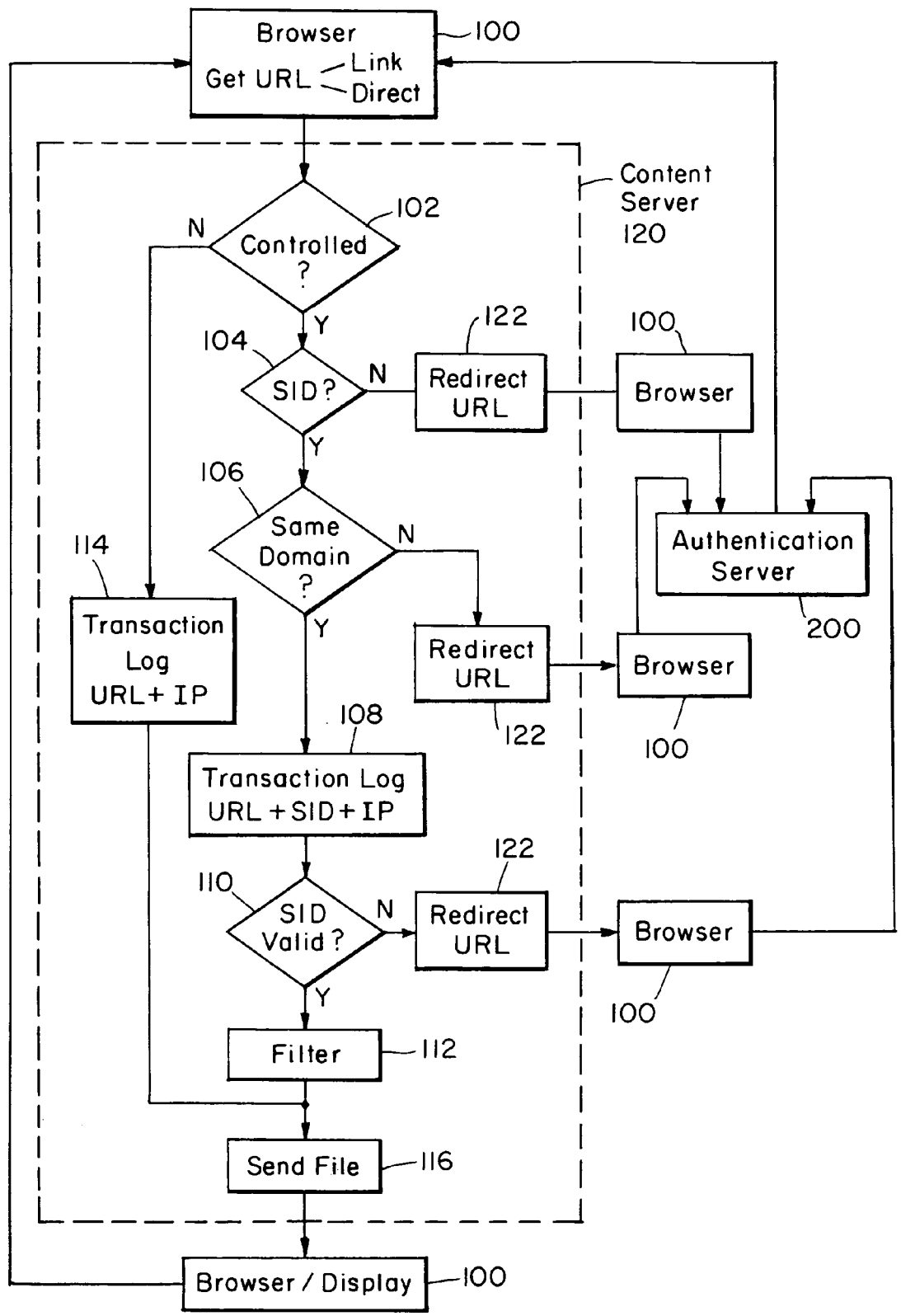
FIG. 2A is a flowchart describing the preferred method of Internet server access control and monitoring.
Figure 4:
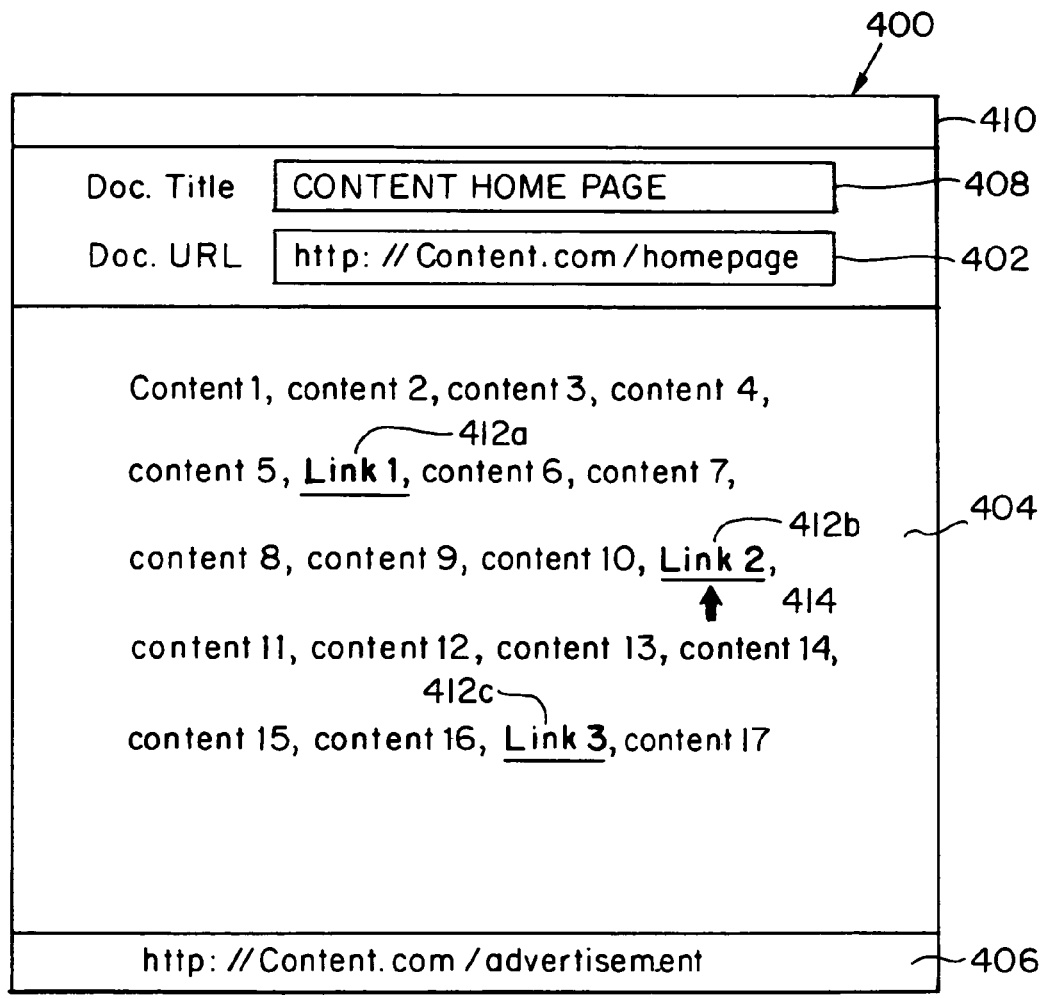
FIG. 4 is an example of a World Wide Web page.

FIG. 2A is a flowchart detailing the preferred process of the present invention and FIG. 4 illustrates a sample Web page displayed at a client by a browser. The page includes text 404 which includes underlined link text 412. The title bar 408 and URL bar 402 display the title and URL of the current web page, respectively. As shown in FIG. 4, the title of the page is "Content Home Page" and the corresponding URL is "http://content.com/homepage". When a cursor 414 is positioned over link text 412*b*, the page which would be retrieved by clicking a mouse is typically identified in a status bar 406 which shows the URL for that link. In this example the status bar 406 shows that the URL for the pointed link 412*b* is directed to a page called "advertisement" in a commercial content server called "content". By clicking on the link text, the user causes the browser to generate a URL GET request at 100 in FIG. 2A. The browser forwards the request to a content server 120, which processes the request by first determining whether the requested page is a controlled document 102. If the request is directed to an uncontrolled page, as in "advertisement" page in this example, the content server records the URL and the IP address, to the extent it is available, in the transaction log 114. The content server then sends the requested page to the browser 116 for display on the user computer 117.

If the request is directed to a controlled page, the content server determines whether the URL contains an SID 102. For example, a URL may be directed to a controlled page name "report", such as "http://content.com/report", that requires an SID. If no SID is present, as in this example, the content server sends a "REDIRECT" response 122 to the browser 100 to redirect the user's initial request to an authentication server 200 to obtain a valid SID. The details of the authentication process are described in FIG. 2B and will be discussed later, but the result of the process is an SID provided from the authentication server to the client. In the above example, a modified URL appended with an SD may be: "http://content-.com/[SID]/report". The preferred SID is a sixteen character ASCII string that encodes 96 bits of SID data, 6 bits per character. It contains a 32-bit digital signature, a 16-bit expiration date with a granularity of one hour, a 2-bit key identifier used for key management, an 8-bit domain comprising a set of information files to which the current SID authorizes access, and a 22-bit user identifier. The remaining bits are reserved for expansion. The digital signature is a cryptographic hash of the remaining items in the SID and the authorized IP address which are encrypted with a secret key which is shared by the authentication and content servers.

If the initial GET URL contains a SID, the content server determines whether the request is directed to a page within the current domain 106. If the request having a SID is directed to a controlled page of a different domain, the SID is no longer valid and, again, the user is redirected to the authentication server 122.

If the request is for a controlled page within the current domain, the content server proceeds to log the request URL, tagged with SID, and the user IP address in the transaction log 108. The content server then validates the SID 110. Such validation includes the following list of checks: (1) the SID's digital signature is compared against the digital signature computed from the remaining items in the SID and the user IP address using the secret key shared by the authentication and content servers; (2) the domain field of the SID is checked to verify that it is within the domain authorized; and (3) the EXP field of the SID is checked to verify that it is later than the current time.

If the validation passes, the content server searches the page to be forwarded for any absolute URL links contained therein 112, that is, any links directed to controlled documents in different content servers. The content server augments each absolute URL with the current SID to facilitate authenticated accesses across multiple content servers. The requested page as processed is then transmitted to the client browser for display 117. The user viewing the requested Web page may elect to traverse any link on that page to trigger the entire sequence again 100.

Figure 2B:
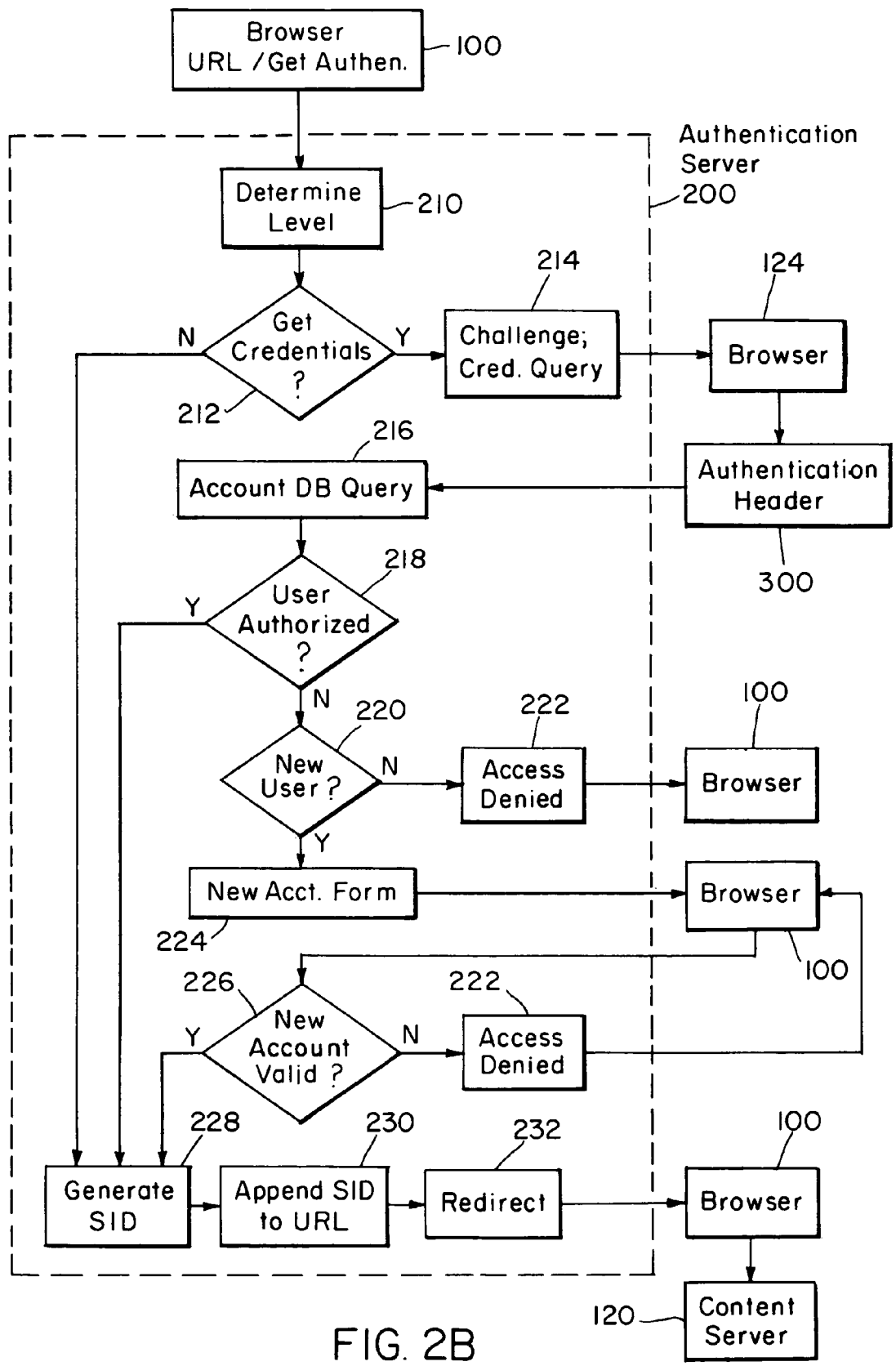
FIG. 2B is a related flowchart describing the details of the authentication process.

FIG. 2B describes the details of the authentication process. The content server may redirect the client to an authentication server. The REDIRECT URL might be: "http://auth.com/authenticate?domain=[domain]&URL=http://content.com/report". That URL requests authentication and specifies the domain and the initial URL. In response to the REDIRECT, the client browser automatically sends a GET request with the provided URL.

Whenever the content server redirects the client to the authentication server 200, the authentication server initiates the authorization process by validating that it is for an approved content server and determining the level of authentication required for the access requested 210. Depending on this level, the server may challenge the user 212 for credentials. If the request is for a low level document, the authentication may issue an appropriate SID immediately 228 and forego the credential check procedures. If the document requires credentials, the authentication server sends a "CHALLENGE" response which causes the client browser to prompt the user for credentials 214. A preferred credential query typically consists of a request for user name and password. If the user is unable to provide a password, the access is denied. The browser forms an authorization header 300 from the information provided, and resends a GET request to the authentication server using the last URL along with an authorization header. For example, a URL of such a GET request may be: "http://auth.com/authenticate?domain=[domain] &URL=http://content.com/report and the authorization header may be:"AUTHORIZE:[authorization]".

Upon receiving the GET request, the authentication server queries an account database 216 to determine whether the user is authorized 218 to access the requested document. A preferred account database may contain a user profile which includes information for identifying purposes, such as client IP address and password, as well as user demographic information, such as user age, home address, hobby, or occupation, for later use by the content server. If the user is authorized, an SID is generated 228 as previously described. If the user is not cleared for authorization, the authentication server checks to see if the user qualifies for a new account 220. If the user is not qualified to open a new account, a page denying access 222 is transmitted to the client browser 100. If the user is qualified, the new user is sent a form page such as illustrated in FIG. 5 to initiate a real-time on-line registration 224. The form may, for example, require personal information and credit references from the user. The browser is able to transmit the data entered by the user in the blanks 502 as a "POST" message to the authentication server. A POST message causes form contents to be sent to the server in a data body other than as part of the URL. If the registration form filled out by the new user is valid 226, an appropriate SID is generated 228. If the registration is not valid, access is again denied 222.

An SID for an authorized user is appended ("tagged") 230 to the original URL directed to a controlled page on the content server. The authentication server then transmits a REDIRECT response 232 based on the tagged URL to the client browser 100. The modified URL, such as "http://content.com/[SID]/report" is automatically forwarded to the content server 120.

Figure 3:
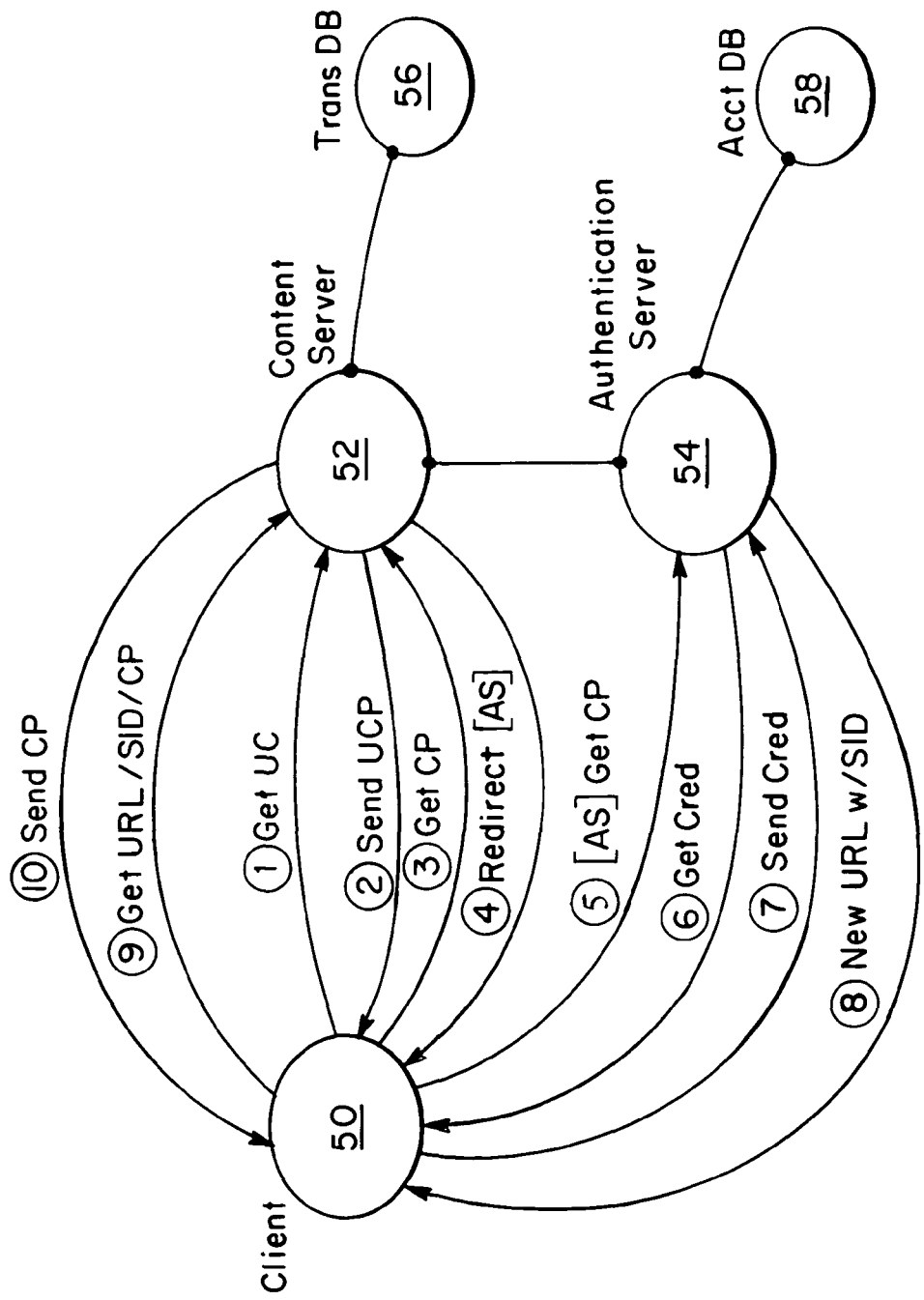
FIG. 3 illustrates an example of a client-server exchange session involving the access control and monitoring method of the present invention.

FIG. 3, illustrates a typical client-server exchange involving the access control and monitoring method of the present invention. In Step 1, the client 50 running a browser transmits a GET request through a network for an uncontrolled page (UCP). For example, the user may request an advertisement page by transmitting a URL "http://content.com/advertisement", where "content.com" is the server name and "advertisement" is the uncontrolled page name. In Step 2, the content server 52 processes the GET request and transmits the requested page, "advertisement". The content server also logs the GET request in the transaction database 56 by recording the URL, the client IP address, and the current time.

In Step 3, the user on the client machine may elect to traverse a link in the advertisement page directed to a controlled page (CP). For example, the advertisement page may contain a link to a controlled page called "report". Selecting this link causes the client browser 50 to forward a GET request through a URL which is associated with the report file "http://content.com/report". The content server 52 determines that the request is to a controlled page and that the URL does not contain an SID. In Step 4, the content server transmits a REDIRECT response to the client, and, in Step 5, the browser automatically sends the REDIRECT URL to the authentication server 54. The REDIRECT URL sent to the authentication server may contain the following string: "http://auth.com/authenticate?domain=[domain] &URL=http://content.com/report"

The authentication server processes the REDIRECT and determines whether user credentials (CRED) are needed for authorization. In Step 6, the authentication server transmits a "CHALLENGE" response to the client. As previously described, typical credentials consist of user name and password. An authorization header based on the credential information is then forwarded by the client browser to the authentication server. For example, a GET URL having such an authorization header is: "http://autho.com/authenticate?domain=[domain]&URL=http://content.com/report and the authorization header may be:"AUTHORIZE:[authorization]". The authentication server processes the GET request by checking the Account Database 58. If a valid account exists for the user, an SID is issued which authorizes access to the controlled page "report" and all the other pages within the domain.

As previously described, the preferred SID comprises a compact ASCII string that encodes a user identifier, the current domain, a key identifier, an expiration time, the client IP address, and an unforgeable digital signature. In Step 8, the authentication server redirects the client to the tagged URL, "http://content.com/[SID]/report", to the client. In Step 9, the tagged URL is automatically forwarded by the browser as a GET request to the content server. The content server logs the GET request in the Transaction database 56 by recording the tagged URL, the client IP address, and the current time. In Step 10, the content server, upon validating the SID, transmits the requested controlled page "report" for display on the client browser.

According to one aspect of the present invention, the content server periodically evaluates the record contained in the transaction log 56 to determine the frequency and duration of accesses to the associated content server. The server counts requests to particular pages exclusive of repeated requests from a common client in order to determine the merits of the information on different pages for ratings purposes. By excluding repeated calls, the system avoids distortions by users attempting to "stuff the ballot box."

In one embodiment, the time intervals between repeated requests by a common client are measured to exclude those requests falling within a defined period of time.

Additionally, the server may, at any given time, track access history within a client-server session. Such a history profile informs the service provider about link traversal frequencies and link paths followed by users. This profile is produced by filtering transaction logs from one or more servers to select only transactions involving a particular user ID (UID). Two subsequent entries, A and B, corresponding to requests from a given user in these logs represent a link traversal from document A to document B made by the user in question. This information may be used to identify the most popular links to a specific page and to suggest where to insert new links to provide more direct access. In another embodiment, the access history is evaluated to determine traversed links leading to a purchase of a product made within commercial pages. This information may be used, for example, to charge for advertising based on the number of link traversals from an advertising page to a product page or based on the count of purchases resulting from a path including the advertisement. In this embodiment, the server can gauge the effectiveness of advertising by measuring the number of sales that resulted from a particular page, link, or path of links. The system can be configured to charge the merchant for an advertising page based on the number of sales that resulted from that page.

According to another aspect of the present invention, a secondary server, such as the authentication server 200 in FIG. 2B, may access a prearranged user profile from the account database 216 and include information based on such a profile in the user identifier field of the SID. In a preferred embodiment, the content server may use such an SID to customize user requested pages to include personalized content based on the user identifier field of the SID.

In another aspect of the invention, the user may gain access to domain of servers containing journals or publications through a subscription. In such a situation, the user may purchase the subscription in advance to gain access to on-line documents through the Internet. The user gains access to a subscribed document over the Internet through the authorization procedure as described above where an authorization indicator is preferably embedded in a session identifier. In another embodiment, rather than relying on a prepaid subscription, a user may be charged and billed each time he or she accesses a particular document through the Internet. In that case, authorization may not be required so long as the user is fully identified in order to be charged for the service. The user identification is most appropriately embedded in the session identifier described above.

Figure 6:
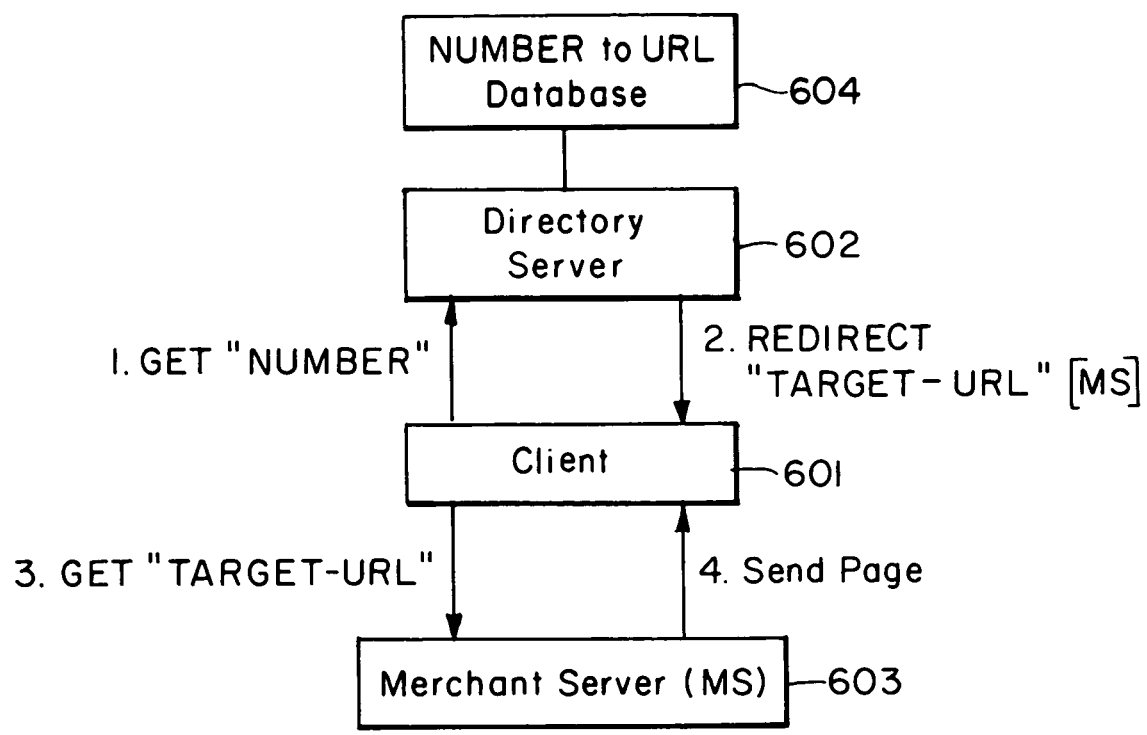
FIG. 6 is a diagram describing the details of the translation of telephone numbers to URLs.

In another aspect of the invention, facilities are provided to allow users to utilize conventional telephone numbers or other identifiers to access merchant services. These merchant services can optionally be protected using SIDs. In a preferred embodiment, as shown in FIG. 6, a Web browser client 601 provides a "dial" command to accept a telephone number from a user, as by clicking on a "dial" icon and inputting the telephone number through the keyboard. The browser then constructs a URL of the form "http://directory.net/NUMBER", where NUMBER is the telephone number or other identifier specified by the user. The browser then performs a GET of the document specified by this URL, and contacts directory server 602, sending the NUMBER requested in Message 1.

In another embodiment, implemented with a conventional browser, client 601 uses a form page provided by directory server 601 that prompts for a telephone number or other identifier in place of a "dial" command, and Message 1 is a POST message to a URL specified by this form page.

Once NUMBER is received by directory server 601, the directory server uses database 604 to translate the NUMBER to a target URL that describes the merchant server and document that implements the service corresponding to NUMBER. This translation can ignore the punctuation of the number, therefore embedded parenthesis or dashes are not significant.

In another embodiment an identifier other than a number may be provided. For example, a user may enter a company name or product name without exact spelling. In such a case a "soundex" or other phonetic mapping can be used to permit words that sound alike to map to the same target URL. Multiple identifiers can also be used, such as a telephone number in conjunction with a product name or extension.

In Message 2, Directory server 602 sends a REDIRECT to client 601, specifying the target URL for NUMBER as computed from database 604. The client browser 601 then automatically sends Message 3 to GET the contents of this URL. Merchant server 603 returns this information in Message 4. The server 602 might have returned a Web page to the client to provide an appropriate link to the required document. However, because server 602 makes a translation to a final URL and sends a REDIRECT rather than a page to client 601, the document of message 4 is obtained without any user action beyond the initial dial input.

The Target URL contained in Message 3 can be an ordinary URL to an uncontrolled page, or it can be a URL that describes a controlled page. If the Target URL describes a controlled page then authentication is performed as previously described. The Target URL can also describe a URL that includes an SID that provides a preauthorized means of accessing a controlled page.

Among benefits of the "dial" command and its implementation is an improved way of accessing the Internet that is compatible with conventional telephone numbers and other identifiers. Merchants do not need to alter their print or television advertising to provide an Internet specific form of contact information, and users do not need to learn about URLs.

In the approach a single merchant server can provide multiple services that correspond to different external "telephone numbers" or other identifiers. For example, if users dial the "flight arrival" number they could be directed to the URL for the arrival page, while, if they dial the "reservations" number, they would be directed to the URL for the reservations page. A "priority gold" number could be directed to a controlled page URL that would first authenticate the user as belonging to the gold users group, and then would provide access to the "priority gold" page. An unpublished "ambassador" number could be directed to a tagged URL that permits access to the "priority gold" page without user authentication.

This invention has particular application to network sales systems such as presented in U.S. patent application Ser. No. 08/328,133, filed Oct. 24, 1994, by Payne et al. which is incorporated herein by reference.

EQUIVALENTS

Those skilled in the art will know, or be able to ascertain using no more than routine experimentation, many equivalents to the specific embodiments or the invention described herein. These and all other equivalents are intended to be encompassed by the following claims.

What is claimed is:

1. A method of tracking web page requests received at a web server from a plurality of clients, comprising:
generating a plurality of session identifiers at the web server, each of the plurality of session identifiers having information associated with a particular client making a web page request to the web server;
storing the session identifiers at a plurality of web browsers operated by the clients;
receiving web page requests at the web server, each web page request including a session identifier associated with a particular client making the web page request;
storing information regarding the web page requests at the web server, the information including the requested web page and the session identifier associated with the request; and
tracking the web page requests by evaluating the information stored at the web server and by counting the number of requests for particular web pages exclusive of repeated requests from a particular client utilizing information associated with a particular client.

2. The method of claim 1, wherein the web page requests comprise Uniform Resource Locator (URL) requests, the URL requests being stored at the web server along with the session identifier associated with the request.

3. The method of claim 2, wherein the session identifier is appended to the URL request.

4. The method of claim 2, wherein the session identifier is embedded in the URL request.

5. The method of claim 1, wherein the counting step excludes repeated requests from a particular client that occur during a predetermined period of time, and thereafter counts a repeated request for the same web page from the particular client.

6. The method of claim 1, wherein the session identifier is cryptographically generated.

7. The method of claim 1, wherein the information associated with a particular client includes a user identifier for the client.

8. The method of claim 1, wherein the information associated with a particular client includes an IP address for the client.

9. The method of claim 1, wherein the information associated with a particular client includes an unforgeable digital signature.

10. The method of claim 1, wherein repeated requests from a particular client are identified by the web server using the stored session identifiers associated with the web page requests.

11. The method of claim 1, wherein the counting step enables an operator of the web server to determine the merits of information presented through the requested web pages for ratings purposes by avoiding distortions in the counting process through the exclusion of the repeated requests from a particular client.

12. A web server for tracking web page requests received from a plurality of clients, comprising:
means for generating a plurality of session identifiers, each of the plurality of session identifiers having information associated with a particular client making a web page request to the web server;
means for receiving web page requests, each web page request including a session identifier associated with a particular client making the web page request;

a database for storing information regarding the web page requests, the information including the requested web page and the session identifier associated with the request; and means for tracking the web page requests by evaluating the information stored in the database and by counting the number of requests for particular web pages exclusive of repeated requests from a particular client utilizing information associated with a particular client.

13. The web server of claim 12, wherein the web page requests comprise Uniform Resource Locator (URL) requests, the URL requests being stored in the database along with the session identifier associated with the request.

14. The web server of claim 13, wherein the session identifier is appended to the URL request.

15. The web server of claim 13, wherein the session identifier is embedded in the URL request.

16. The web server of claim 12, wherein the tracking means excludes repeated requests from a particular client that occur during a predetermined period of time, and thereafter counts a repeated request for the same web page from the particular client.

17. The web server of claim 12, wherein the session identifier is cryptographically generated.

18. The web server of claim 12, wherein the information associated with a particular client includes a user identifier for the client.

19. The web server of claim 12, wherein the information associated with a particular client includes an IP address for the client.

20. The web server of claim 12, wherein the information associated with a particular client includes an unforgeable digital signature.

21. The web server of claim 12, wherein repeated requests from a particular client are identified by the web server using the stored session identifiers associated with the web page requests.

22. The web server of claim 12, wherein the tracking means enables an operator of the web server to determine the merits of information presented through the requested web pages for ratings purposes by avoiding distortions in the counting process through the exclusion of the repeated requests from a particular client.

* * * * *